US012634527B1

(12) United States Patent

Gaquin et al.

(10) Patent No.:  US 12,634,527 B1

(45) Date of Patent:       May 19, 2026

(54) COMPUTER-IMPLEMENTED METHODS FOR LIVE EVENT SERVER-SIDE CONTENT SYNCHRONIZATION

(71) Applicant: Amazon Technologies, Inc., Seattle, WA (US)

(72) Inventors: John F.X. Gaquin, Lynnwood, WA (US); Ravindra Ganti, Sammamish, WA (US); Yusuf Alhussein Mohammed Taha, Seattle, WA (US); Michael Patrick Dean, Lake Stevens, WA (US); Parminder Singh, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/610,967

(22) Filed: Mar. 20, 2024

(51) Int. Cl.
H04N 21/2187      (2011.01)
H04N 21/8547      (2011.01)

(52) U.S. Cl.
CPC ..... H04N 21/2187 (2013.01); H04N 21/8547 (2013.01)

(58) Field of Classification Search
CPC ...................... H04N 21/2187; H04N 21/8547
USPC ....................................................... 725/116
See application file for complete search history.

(56) References Cited

U.S. PATENT DOCUMENTS 10,979,477  B1 *   4/2021   Cabrido ................ H04L 65/611
2003/0208771  A1    11/2003   Hensgen et al.

| | | |
|---|---|---|
| 2006/0067580 A1 | 3/2006 | Lee et al. |
| 2015/0121436 A1* | 4/2015 | Rango .................... G11B 27/34 |
| | | 725/88 |
| 2018/0199080 A1 | 7/2018 | Jackson, Jr. et al. |
| 2018/0220166 A1 | 8/2018 | Meyer |
| 2020/0267434 A1* | 8/2020 | Sanghavi ......... H04N 21/26258 |
| 2021/0099733 A1* | 4/2021 | Xie .................... H04N 21/4307 |
| 2022/0329641 A1 | 10/2022 | Giladi |
| 2022/0399029 A1* | 12/2022 | Ibrahim ............... G10H 1/0091 |

OTHER PUBLICATIONS

Sommerville, Greg, "Automatically Compare Two Videos to Find Common Content", Amazon Web Services Media & Entertainment Blog, available online at <https://aws.amazon.com/blogs/media/metfc-automatically-compare-two-videos-to-find-common-content/>, Jul. 22, 2021, 8 pages.
U.S. Appl. No. 17/847,876, filed Jun. 23, 2022.

* cited by examiner

*Primary Examiner* — Nnenna N Ekpo
(74) *Attorney, Agent, or Firm* — NICHOLSON DE VOS WEBSTER & ELLIOTT LLP

(57)            ABSTRACT

Techniques for live event server-side content synchronization are described. According to some examples, a computer-implemented method includes receiving, at a content delivery service, a first live stream of an event and a first timestamp for the first live stream, and a second live stream of the event and a second timestamp for the second live stream; determining, by the content delivery service, a time offset between the first live stream of the event and the second live stream of the event; modifying, by the content delivery service, the second timestamp based at least in part on the time offset to generate a modified second timestamp for the second live stream to align the second live stream with the first live stream; and sending, by the content delivery service, the second live stream and the modified second timestamp to a client device or a storage.

20 Claims, 14 Drawing Sheets

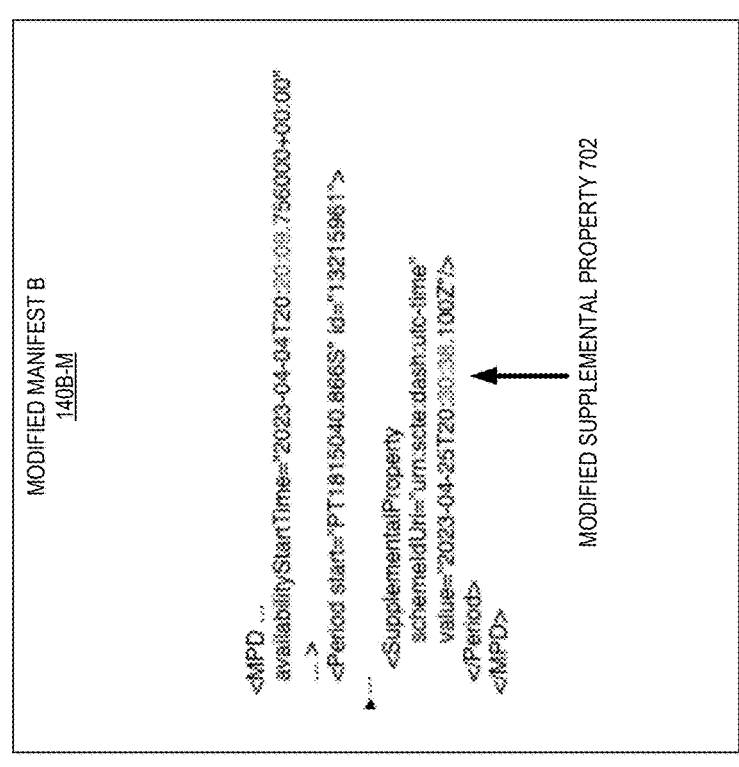
MODIFIED MANIFEST B
140B-M
MODIFIED SUPPLEMENTAL PROPERTY 702
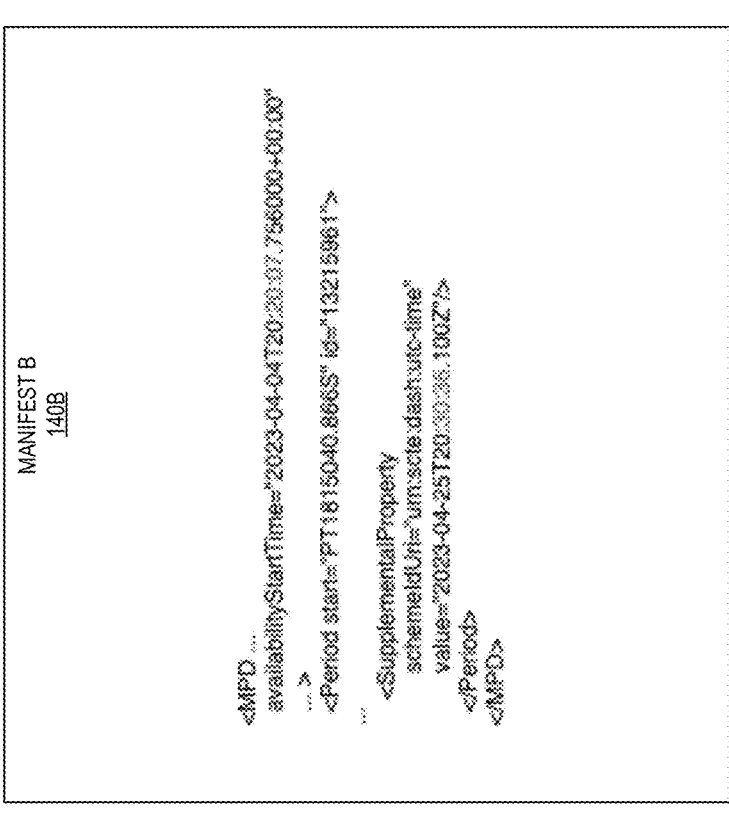
MANIFEST B
140B
*FIG. 7*

900

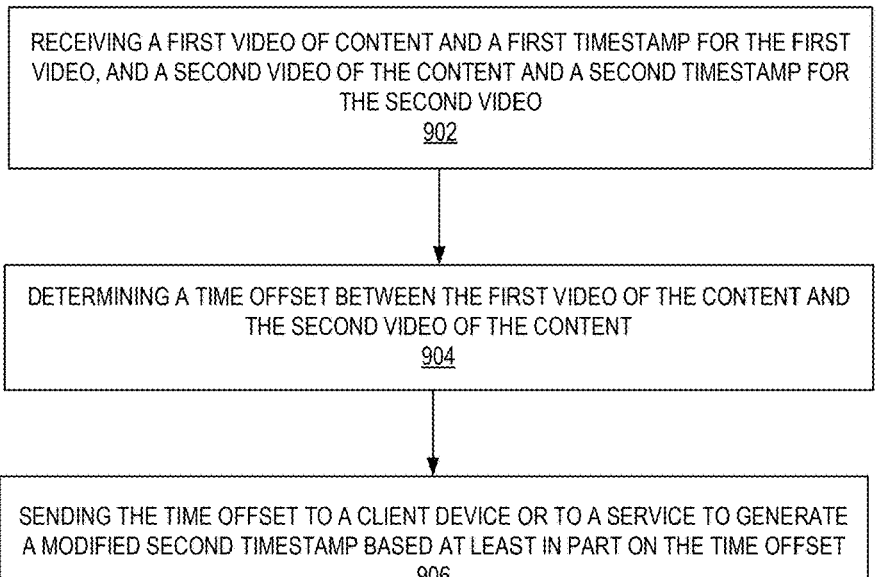

RECEIVING A FIRST VIDEO OF CONTENT AND A FIRST TIMESTAMP FOR THE FIRST VIDEO, AND A SECOND VIDEO OF THE CONTENT AND A SECOND TIMESTAMP FOR THE SECOND VIDEO
902

DETERMINING A TIME OFFSET BETWEEN THE FIRST VIDEO OF THE CONTENT AND THE SECOND VIDEO OF THE CONTENT
904

SENDING THE TIME OFFSET TO A CLIENT DEVICE OR TO A SERVICE TO GENERATE A MODIFIED SECOND TIMESTAMP BASED AT LEAST IN PART ON THE TIME OFFSET
906

*FIG. 9*

COMPUTER-IMPLEMENTED METHODS FOR LIVE EVENT SERVER-SIDE CONTENT SYNCHRONIZATION

BACKGROUND

In certain examples, live streaming content is delivered to clients with a clock (e.g., wall clock) timeline as a reference point for time shifting and clipping in the stream. In certain examples, every moment in the stream has an associated timestamp for when that content occurred on the clock's timeline. Certain customer-facing features, from simple time shifting within the video stream, to more advanced features (e.g., Amazon® X-ray, Rapid Recap, or Timehop features), all rely on the clock time in the stream as a reference point for showing the correct content to the customer, e.g., if a customer wants to watch a highlight for a moment in an event, their stream is time shifted to the timestamp associated with the moment. However, due to a number of causes, the clocks across all of the redundant streams for a single event are not fully aligned in certain examples, and this impacts the customer experience for the many features that depend on accurate content timing. In certain examples, the severity of the customer service impact worsens depending on the accuracy required for a feature, e.g., where clipping highlights generally needs accuracy within plus or minus 1 to 2 seconds, while stream switching or multi-camera views (e.g., for certain events, e.g., Formula 1® racing) generally needs accuracy with sub-second tolerances. Inconsistent stream timing currently impacts the accuracy of certain advanced features (e.g., Amazon® X-ray, Rapid Recap, Watch Parties, and just-after-broadcast (JAB) clipping and highlights). Additionally it affects the ability to launch new properties or develop new features that require accurate timing across streams.

In certain examples, live event broadcasts are ingested, encoded, and distributed to customers in a plurality of redundant parallel pipelines. However, the content streamed out of each pipeline will often have differing clock (e.g., wall-clock) timelines, and thus cause inconsistent behavior when time shifting to view specific moments in the content.

Certain solutions for correcting the clock alignment focus on fixing the root causes. But there are many causes for clock misalignment that are inconsistent from property to property. E.g., solutions like source broadcast timecodes may only work for properties with highly controlled production. Timecode bugs exist in multiple services and are triggered by inconsistent edge cases that only affect some properties. Regressions can re-introduce issues that were fixed. In order to reliably deliver a consistent clock to customers, all of these problems would have to be attempted to be fixed individually, and that is not a practical solution.

BRIEF DESCRIPTION OF DRAWINGS

Various examples in accordance with the present disclosure will be described with reference to the following drawings.

FIG. 7 is a diagram illustrating a manifest and a modified version of that manifest from a time (e.g., manifest) manipulation service according to some examples.

FIG. 9 is a flow diagram illustrating operations of a method of a time synchronization of a second live stream to a first live stream according to some examples.

DETAILED DESCRIPTION

Figure 1:
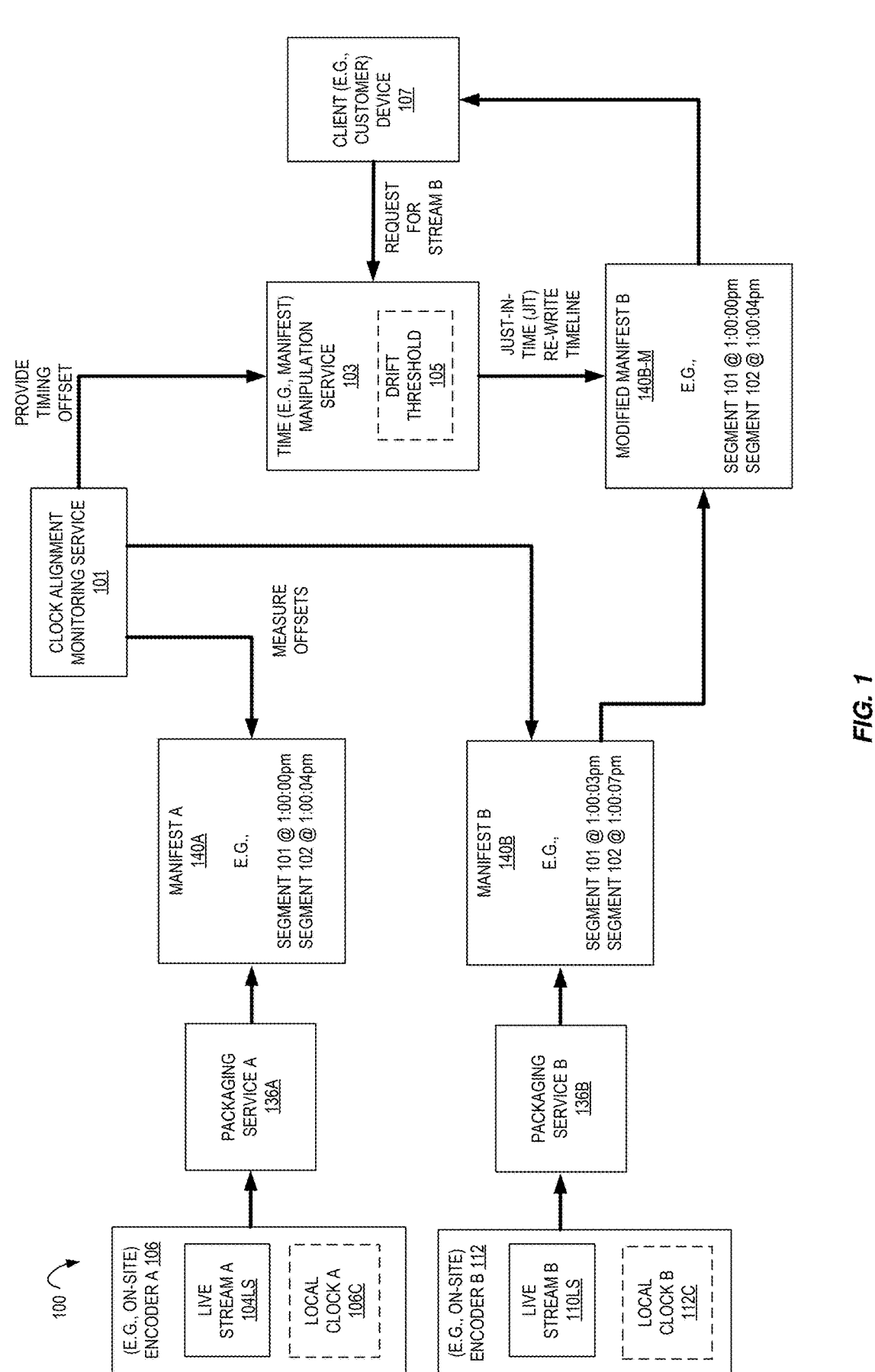
FIG. 1 is a diagram illustrating a clock alignment monitoring service and a time (e.g., manifest) manipulation service for a plurality of live streams according to some examples.

The present disclosure relates to methods, apparatus, systems, and non-transitory computer-readable storage media for live event server-side content synchronization. Examples herein overcome the technical problems discussed above by determining a time offset (e.g., clock offset) between the first video (e.g., first live stream) of the content and the second video (e.g., second live stream) of the content, and modifying the second video (e.g., a second timestamp thereof) based at least in part on the time offset (e.g., to generate a modified second timestamp for the second video). In certain examples, the realignment includes re-aligning the clock offsets between each video stream, e.g., at the server side. Thus, in certain examples, the (e.g., all) client devices observe the same clock (e.g., wall-clock) timelines for the content (e.g., regardless of the encoding and/or geographical region of a plurality of geographical regions of a cloud network provider used for the encoding of the live streams) so that time shifting to a specific moment in any of the plurality of video (e.g., live) streams will provide consistent expected results.

In certain examples, it is the content delivery service/system (e.g., playback service thereof) that performs the determining the time offset and/or modifying the offset video (for example, automatically modifying the offset video by the service/system without a human performing the modification), e.g., (e.g., automatically) modifying the timestamp and/or configurable delay of the offset video (e.g., to remove the time offset). Thus, examples herein allow for a video streaming service (e.g., advanced features thereof) to rely on a consistent clock in the stream in order to provide the best customer experience, e.g., even for a manifest based streaming service (e.g., in contrast to a synchronized clock streaming service, such as, but not limited to, a Sye™ brand synchronized clock streaming service). For example, if an advanced feature (e.g., X-ray feature that will go to a certain portion (e.g., scene) of a video when clicked on)) is to show a video clip that occurred at exactly 1:04:15 pm according to a clock (e.g., wall-clock) of the recording/streaming, the content delivery service/system is to show the same exact same content to every customer, e.g., regardless of region, encoding, or streaming technology.

In certain examples, it is the content delivery service/system (e.g., playback service thereof) that ensures that the streams it is vending are properly aligned. Certain examples herein are directed to a content delivery service/system (e.g., playback service thereof) that delivers live streams to clients (e.g., customers) with an artificially aligned timeline (e.g., independent of the upstream encoder's timecodes) enabling correct clock alignment for customers, e.g., and allowing for time to iteratively prioritize and fix the underlying root causes. Note that certain examples herein are not requiring that the underlying issues causing the time offset are not corrected; rather that certain examples allow a content delivery service/system (e.g., playback service thereof) to be resilient to clock issues and protect the client's (e.g., customer's) experience when misalignment occurs. The technical advantage for doing so decouples the customer-facing clock from the variability of back-end live streaming infrastructure, e.g., giving a content delivery service/system the flexibility to develop timing-critical features outside of the affected area of infrastructure changes.

Examples herein improve the functioning of a computer-implemented method and a user (e.g., client) device by allowing a live event server-side content (e.g., timeline) synchronization, for example, without any action taken by the client (e.g., user) to do so, e.g., without manually adjusting a current location in the second stream (e.g., without manipulating a playback bar in the media player that keeps track of the current location in the duration of the stream) to a corresponding location in a reference stream (e.g., where the reference stream's time data is used for time-based (e.g., advanced) features of a content delivery service/system).

In certain examples, the term "stream timeline" (based on a "stream clock") refers to the clock timeline in a live stream that allows (e.g., advanced) client features (e.g., Rapid Recap and X-ray) to show specific content to clients (e.g., customers). In certain examples, the term "reference timeline" (based on its "stream clock") refers to a clock timeline that provides a reference point as the "source of truth" for the content in the stream. In certain examples, the term "time offset" (or "clock offset") refers to the measured difference between a stream timeline and a reference timeline. In certain examples, the term "clock drift" refers to whether a stream's time offset changes over time. For example, if the measured offset for a stream today is two seconds it should still be two seconds tomorrow, next week, and so on. If not, it is drifting. In certain examples, the term "clock alignment" refers to whether or not the clock offset between two streams is within an acceptable range (e.g., drift threshold) for a particular use case.

Figure 2:
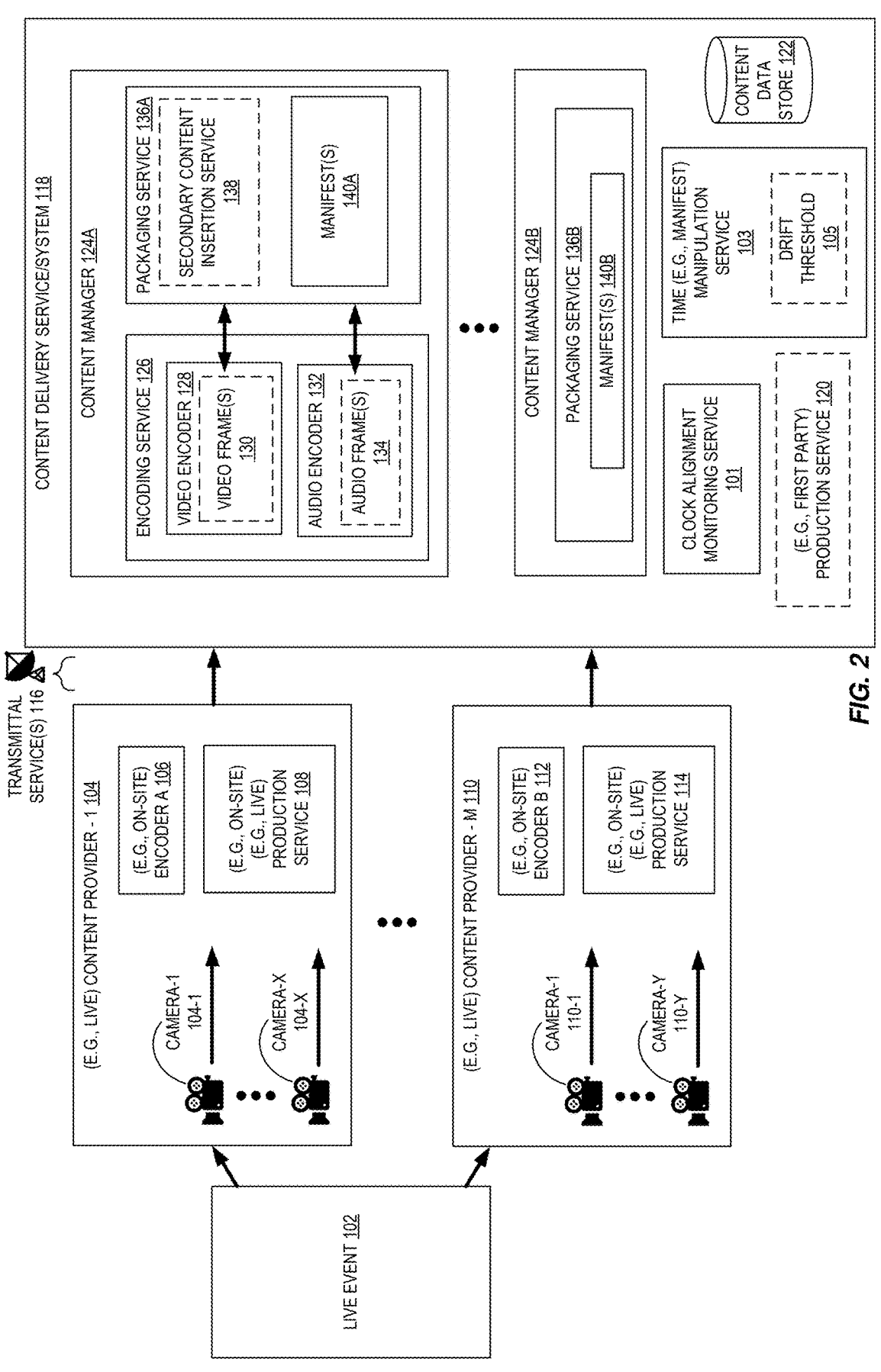
FIG. 2 is a diagram illustrating an environment including one or more content providers to capture a live event on a respective set of one or more cameras (e.g., and microphones) and transmit the video (e.g., live stream) (e.g., along with the corresponding audio) to a content delivery service/system having an encoding service according to some examples.
Figure 3:
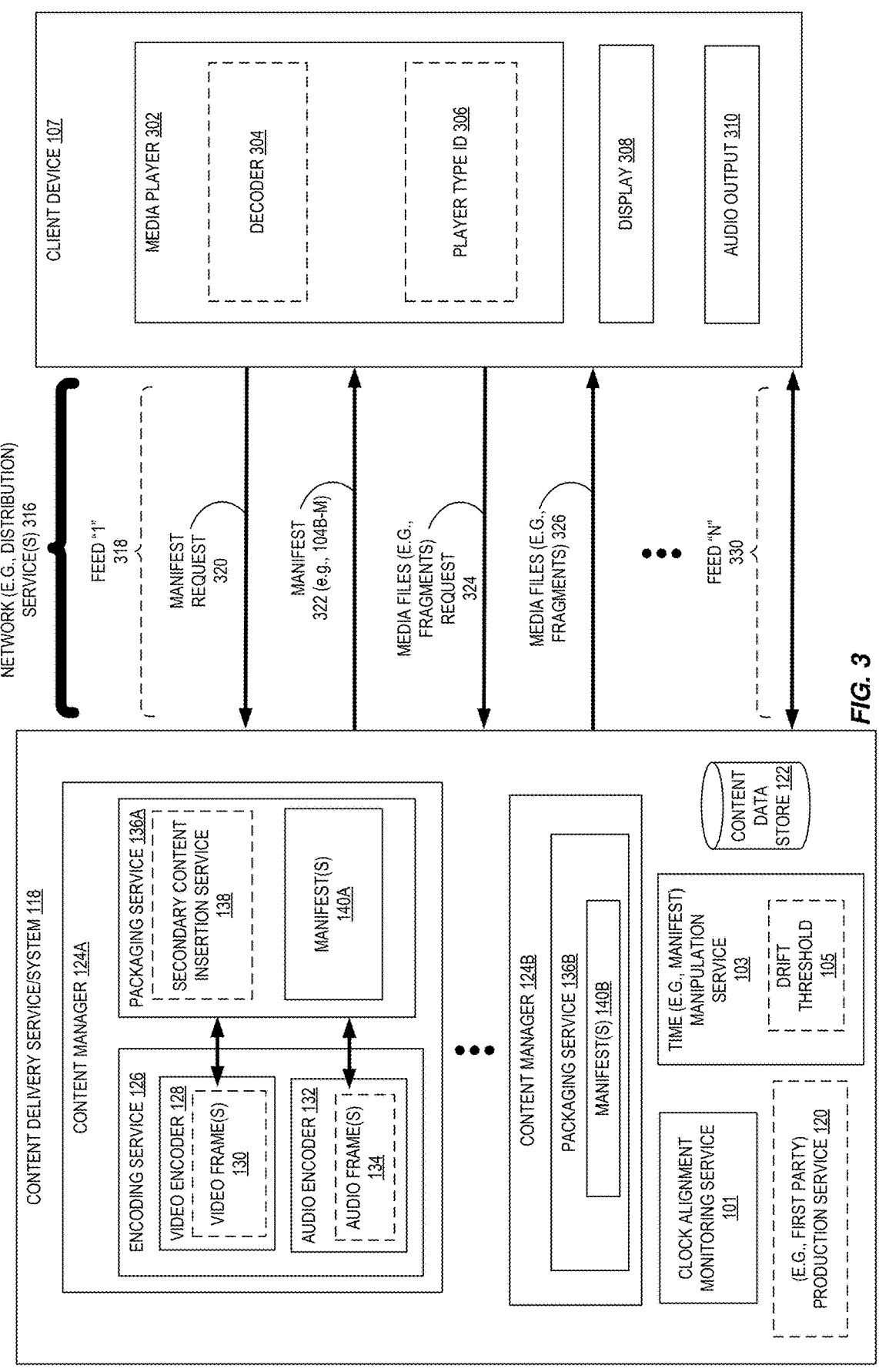
FIG. 3 is a diagram illustrating a content delivery service/system to send videos (e.g., live streams) to a client device according to some examples.

Turning now to the figures, FIG. 1 is a diagram illustrating a clock alignment monitoring service 101 and a time (e.g., manifest) manipulation service 103 for a plurality of live streams (104LS, 110LS) according to some examples. In certain examples, the disclosed environment 100 (e.g., other than client device 107) is implemented by one or more content delivery services/systems, e.g., as shown in FIGS. 2 and 3. In certain examples, clock alignment monitoring service 101 and a time (e.g., manifest) manipulation service 103 together perform a server-side live stream clock alignment. In certain examples, clock alignment monitoring service 101 and a time (e.g., manifest) manipulation service 103 are implemented independently from each other. In certain examples, clock alignment monitoring service 101 and a time (e.g., manifest) manipulation service 103 are implemented together in a single service.

In certain examples, clock alignment monitoring service 101 measures (e.g., proactively measures) the clock alignment for live streams based on an audio and/or visual analysis of the content itself, e.g., and make the alignment data programmatically available to other systems. In certain examples, time (e.g., manifest) manipulation service 103 is to vend (e.g., live) streams (e.g., multimedia streams of video and corresponding audio) with corrected timelines, e.g., ensuring that all streams (e.g., including manifest based streams and/or non-manifest based streams (e.g., a synchronized clock streaming service, such as, but not limited to, a Sye™ brand synchronized clock streaming service)) are aligned to the same reference timeline, e.g., within "X" threshold (e.g., "X" milliseconds) for all clients.

In certain examples, a first live stream 104LS ("live stream A") of an event is captured (e.g., by one or more respective cameras and/or audio recording devices), e.g., and encoded for transmission by (e.g., on-site) encoder 106 (e.g., having a local clock 106C to insert a time indication (e.g., timestamp) for the time of recording generation)). In certain examples, a second live stream 110LS ("live stream B") of that same event is captured (e.g., by one or more respective cameras and/or audio recording devices), e.g., and encoded for transmission by (e.g., on-site) encoder 112 (e.g., having a local clock 112C to insert a time indication (e.g., timestamp) for the time of recording generation)). In certain examples, clock 106C is independent from clock 112C, e.g., they are currently unsynchronized (e.g., and will not be synchronized). In certain examples, a timestamp is time metadata (e.g., program date time (PDT)) included with a livestream. In certain examples, the PDT for a particular stream is based on its own local clock, e.g., PDT for live stream 104LS is based on (e.g., sourced from) local clock 106C and PDT for live stream 110LS is based on (e.g., sourced from) local clock 112C. In certain examples, the first encoder 106 is not clock-synchronized with the second encoder 112.

Certain examples herein manipulate the timestamp (e.g., time metadata) for a stream (e.g., a manifest of the "offset" stream and/or configurable delay of the "offset" stream).

In certain examples, packaging service 136A packages live stream 104LS, e.g., for sending to a client (e.g., customer device) 107. In certain examples, packaging service 136A generates a manifest 140A for the first live stream 104LS. In certain examples, packaging service 136B packages live stream 110LS, e.g., for sending to a client (e.g., customer device) 107. In certain examples, packaging service 136B generates a manifest 140B for the second live stream 110LS. In certain examples, a packing service (136A, 136B) operates according to a video streaming standard. In certain examples, the video streaming standard is a Dynamic Adaptive Streaming over HyperText Transfer Protocol (HTTP) (e.g., "MPEG-DASH" standard), an HTTP Live Streaming (HLS) standard, a Smooth Streaming standard, a UDP based standard, such as, but not limited to, video streaming from Sye™ live streaming, or any other streaming protocols.

In certain examples, multiple live streams of a single event are utilized, for example, because there are (i) redundant live streams for a single event (e.g., in case of a failure of one or more of the live streams), (ii) different geographical regions (e.g., zones) (e.g., for video distribution), and/or (iii) different live streams of varying resolutions for the single event (e.g., to provide a corresponding resolution to a device capable of displaying that resolution).

In certain examples, the timestamp metadata (e.g., PDT metadata) is delivered with the manifests and/or the video files (e.g., fragments or packets about video data, for example, a manifest and/or video file according to a streaming standard, e.g., a Transmission Control Protocol (TCP) and/or User Datagram Protocol (UDP) based streaming).

In the depicted example, first (e.g., reference) live stream A (104LS) has a first segment "101" that has a timestamp (e.g., generated based on local clock 106C) of one p.m. and zero minutes and zero seconds and a second segment "102" has a timestamp (e.g., generated based on local clock 106C) of one p.m. and zero minutes and four seconds, and second (e.g., non-reference) live stream B (110LS) has the same first segment "101" but with a timestamp (e.g., generated based on local clock 112C) of one p.m. and zero minutes and three seconds and the same second segment "102" has a timestamp (e.g., generated based on local clock 112C) of one p.m. and zero minutes and seven seconds.

In certain examples, clock alignment monitoring service 101 is to monitor the alignment of the first live stream 104LS and the second live stream 110LS, for example, to determine (e.g., measure) a time offset (e.g., three seconds for each segment in the example above) between the first live stream of the event and the second live stream of the event. In certain examples, the time offset (e.g., three seconds in the above example) is provided (e.g., in response to a request from client device 107 for live stream B 110LS) to time (e.g., manifest) manipulation service 103, which is then to modify the timestamp in manifest B 140B for live stream B 110LS to remove the time offset, e.g., by removing three seconds from the timestamps for each of segment "101", segment "102", etc. to generate modified manifest B 140B-M (e.g., to have a timestamp of one p.m. and zero minutes and zero seconds and a second segment "102" that has a timestamp of one p.m. and zero minutes and four seconds). In certain examples, this modification (e.g., re-write) of the manifest is a just-in-time (JIT) re-write, e.g., performed immediately prior to sending that modified manifest B 104B-M to the client device 107 instead of un-modified manifest B 104B.

Although two live streams are discussed, it should be understood that a third or more live stream may be monitored and/or manipulated according to this disclosure.

Certain examples herein are not about synchronizing the playback of devices at the live head, e.g., although having synchronized clocks is a dependency to be able to synchronize playback. Certain examples herein do not change the customer experience at the live head, e.g., but each stream will change. In certain examples, the (e.g., only) difference between a reference stream and a time delayed stream will be the timestamp value associated with the content as it is delivered in the time delayed stream, e.g., which only affects time shifting-related features, and is transparent to the client (e.g., customer). Thus, certain examples herein do not use the word "synchronize", e.g., instead preferring to describe the problem in terms of clock alignment. However, having aligned stream timelines enables capabilities to synchronize playback in various circumstances, for example, where clock alignment is used for multiple streams of a live watch party because it is necessary to force all clients to playout from a particular timecode in the stream (e.g., which may not be the absolute most recent content in a given stream). In certain examples, aligned clocks enable a synchronized clock streaming service, such as, but not limited, to a Sye™ brand synchronized clock streaming service, to synchronize playback between streams and encoders.

Clock Alignment Versus Drift

In certain examples, e.g., although clock alignment monitoring service 101 and time (e.g., manifest) manipulation service 103 combined will correct for misaligned clocks at any given moment, there are circumstances when the alignment changes over time. In certain examples, clock alignment monitoring service 101 is able to determine when measured offsets are changing and track the rate of drift, e.g., and make changes in alignment available to downstream systems (e.g., time (e.g., manifest) manipulation service 103).

In certain examples, the time (e.g., manifest) manipulation service 103 is to provide durable timelines to clients, and thus is not to change the timing of content in the middle of an active session (e.g., stream). Thus in certain examples, the time (e.g., manifest) manipulation service 103 handles when offsets change and keep manifests specification compliant. In certain examples, this means the time (e.g., manifest) manipulation service 103 inserts one or more discontinuities (e.g., inserting a time marker that is readable by a service/system in the timeline, etc.) in the stream in a stateful manner to bring the timeline back into alignment, or it may deliberately allow streams to drift out of alignment while there are active events (e.g., a client device viewing that stream).

In certain examples (e.g., when in a time window where timestamp modification is allowed), timestamp modification does not occur unless the time drift exceeds a drift threshold 105, e.g., a (e.g., user set) threshold of a time differential (e.g., in milliseconds).

In certain examples, the clock alignment drift is relatively slow, e.g., with meaningful drift occurring over the course of days in the worst case. Thus, in certain examples, the clock alignment monitoring service's monitoring does not need to be frequent and real-time, e.g., it can be according to drift threshold 105.

In certain examples, clock alignment monitoring service 101 is run once per day on a set of streams. In certain examples, clock alignment monitoring service 101 is run once after the set of streams is deployed, e.g., and then not run again (e.g., relying on the determined time offset being persistent, e.g., as stored "time offset" 412 in FIG. 4).

FIG. 2 is a diagram illustrating an environment 100 including one or more content providers (104, 110) to capture a live event 102 on a respective set of one or more cameras (e.g., one or more of cameras 104-1 to 104-X, where X is any positive integer greater than one, and one or more of cameras 110-1 to 110-Y, where Y is any positive integer greater than one,) (e.g., and microphones) and transmit the video (e.g., live stream) (e.g., along with the corresponding audio) to a content delivery service/system 118 having an encoding service 126 according to some examples.

In certain examples, the live event 102 is a game of a sporting match, such as, but not limited to, each individual game of baseball, softball, football, soccer, basketball, hockey, etc. In certain examples, one or more (e.g., live)

content providers (e.g., video production truck(s)) are on site to capture video (e.g., and audio) of the live event 102.

In certain examples, a (e.g., single) content provider 104 is on site to capture video (e.g., and audio) of the live event 102. In certain examples, content provider 104 includes (e.g., or has access to the video output of) one or more of cameras 104-1 to 104-X. In certain examples, content provider 104 includes an (e.g., on-site) encoder 106 (e.g., with its own local clock 106C). In certain examples, content provider 104 includes a (e.g., on-site) (e.g., live) production service 108, e.g., to allow multi-camera video production such that the video from two or more cameras and or the audio from two or more audio sources are combined into a single output as a dynamic mix (e.g., by a director). In certain examples, content provider 104 is to encode the resulting output with encoder 106 and send that encoded content to one or more downstream entities (e.g., content delivery service/system 118 and/or user(s)), for example, via (e.g., wired and/or wireless) transmittal services 116, e.g., via one or more networks.

In certain examples, one or more additional (e.g., M–1, where M is any positive integer greater than 1) content providers (e.g., content provider 110) are also on site to capture video (e.g., and audio) of the live event 102. In certain examples, content provider 110 includes (e.g., or has access to the video output of) one or more of cameras 110-1 to 110-Y. In certain examples, content provider 110 includes an (e.g., on-site) encoder 112 (e.g., with its own local clock 112C). In certain examples, content provider 110 includes a (e.g., on-site) (e.g., live) production service 114, e.g., to allow multi-camera video production such that the video from two or more cameras and or the audio from two or more audio sources are combined into a single output as a dynamic mix (e.g., by a director). In certain examples, content provider 110 is to encode the resulting output with encoder 112 and send that encoded content to one or more downstream entities (e.g., content delivery service/system 118 and/or user(s)), for example, via (e.g., wired and/or wireless) transmittal services 116, e.g., via one or more networks.

In certain examples, the content from content provider(s) 104, 110, etc. is sent to one or more content delivery services/systems (e.g., content delivery service/system 118).

The depicted content delivery service/system 118 includes a content data store 122, which may be implemented in one or more data centers. As one example, a media file (e.g., including a video file and audio file) (e.g., a media container) that is to be encoded is accessed from the content data store 122 by one or more content managers 124A-124B. In certain examples, the media file may be uploaded to content data store 122 by content provider(s) or provided directly (e.g., as live content) to one or more content managers 124A-124B by content provider(s) (e.g., from a live content encoder).

In certain examples, the content manager (e.g., described in reference to content manager 124A, but one or more other content managers may include one or more of the components discussed herein) controls the encoding (e.g., transcoding) of a media file into packages and files in various formats and in different sizes for distribution to end users (e.g., viewers). In certain examples, a user (e.g., separate from an end user or client) creates a job for a (e.g., uncompressed) multimedia file by specifying (e.g., via a console of or an application programming interface (API) call to the content manager) the information that the service will use to perform the encoding (e.g., transcoding) which may include, which multimedia file(s) to encode (e.g., transcode), which types of files to create and where to store them, which encoding settings to use, which advanced features to apply, etc. In certain examples, to set up a job, a user specifies the input files (e.g., from content data store 122) for the service to encode (e.g., transcode from one format to a different format), for example, by specifying the source for each video, audio, and/or captions media element. That source might be a specific part of a primary input file, or it might be a separate file. In certain examples, to set up a job, a user specifies the types of output files (e.g., and packages) that are to be generated from the input. In certain examples, to set up a job, a user specifies the encoding settings to produce the quality and type of output that is desired.

In certain examples, the encoding service 126 is to encode the media file (e.g., video file and corresponding audio file) into one or more sets of video and audio representations (e.g., streams). In FIG. 2, video encoder 128 is to receive an input of a video file and create video frame(s) 130 from that video file, e.g., for a video frame and/or fragment duration. In FIG. 2, audio encoder 132 is to receive an input of an audio file and create audio frame(s) 134 (e.g., a number of audio samples within each frame) for that audio file, e.g., at an audio frame and/or fragment duration. In certain examples, packaging service (136A, 136B) is then to create one or more sets of multimedia (e.g., video and audio) representations (e.g., a media presentation), for example, a representation according to a standard (e.g., a MPEG-DASH standard, a HyperText Transfer Protocol (HTTP) Live Streaming (HLS) standard, a Smooth Streaming standard, or other standard). Encoding service 126 may include a plurality of instances of video encoder 128 and audio encoder 132, e.g., to process multiple inputs in parallel. In certain examples, secondary content insertion service 138 adds secondary content (e.g., advertisement(s)) into a main content. In certain examples, encoding service 110 is to encode both the main content and secondary content, e.g., and the secondary content insertion service 138 is to insert the secondary content into the main content.

In certain examples, the content delivery service/system 118 includes a clock alignment monitoring service 101 and a time (e.g., manifest) manipulation service 103 discussed herein.

FIG. 3 is a diagram illustrating a content delivery service/system 118 to send videos (e.g., live streams) to a client device 107 according to some examples. In certain examples, client device 107 includes a media player 302 to play one or more feeds (e.g., live streams), for example, sent via network (e.g., distribution) services 316. In certain examples, media player 302 includes a decoder 304 to decode a feed for viewing on display 308.

In certain examples, content delivery service/system 118 includes a (e.g., first party) production service 120, e.g., to allow multi-provider video production such that the video from two or more providers and or the audio from two or more audio providers are combined into a single output as a dynamic mix (e.g., by a director). In certain examples, content delivery service/system 118 is to encode the resulting output and send that encoded content to one or more downstream entities (e.g., one or more instances of client device 107), for example, via (e.g., wired and/or wireless) network services 316.

In certain examples, packaging service 136A includes one or more manifests 140A and/or packaging service 136B includes one or more manifests 140B, e.g., each manifest identifying the media file(s) (e.g., fragments, streams, etc.) to be output from its content manager. In certain examples, a manifest for a particular media file (e.g., a particular title) identifies a proper subset of video and audio representations of the media file for a particular client device 107 (e.g., based on the client's media player 302 (e.g., determined from its type ID value 306), display 308 resolution, audio output 310 capabilities, and/or available bandwidth). In certain examples, the content is sourced from the content delivery service/system 118 in two parts: (i) the manifest 140 of all available media representations (e.g., their URL addresses and, optionally, other characteristics) and (ii) the media files (e.g., representations) (e.g., stream of fragments) in a single (e.g., container) or multiple files.

In certain examples, a client device 107 is to read (or store) a manifest 140 (e.g., sent in response to manifest request 320) before the client device may make a request for the media from that manifest, and thus access media files (e.g., audio fragments and corresponding video fragments) from media file content delivery service/system 118 (e.g., content data store 122), e.g., the URL for a live feed. In certain examples, to play feed 1 318, a client device 107 is to read manifest 322 (e.g., modified timestamp 104B-M within the manifest 322) (e.g., sent in response to manifest request 320) before the client device may make a request 324 for the media indicated by that manifest, and thus access media files 326 (e.g., audio fragments and corresponding video fragments) from media file content delivery service/system 118 (e.g., content data store 122), e.g., the URL for live feed 1. This may occur similarly for a second feed (e.g., feed "N" 330, where N is any positive integer greater than one). In certain examples, the device 107 requests live feed "1" 318 (e.g., stream A), and the media file content delivery service/system 118 performs a (e.g., "server side") switch to instead provide live feed "N" 330 (e.g., stream B) to client device 107, for example, and includes a timestamp for that provided stream that is modified according to this disclosure.

In certain examples, the client device 107 (e.g., directly) calls into clock alignment monitoring service 101 to obtain the time offset, for example, to allow the client device 107 (e.g., and not the time (e.g., manifest) manipulation service 103) to remove the time offset, e.g., without a call into the time (e.g., manifest) manipulation service 103 by the client device 107.

Stream Timeline Monitoring

Figure 4:
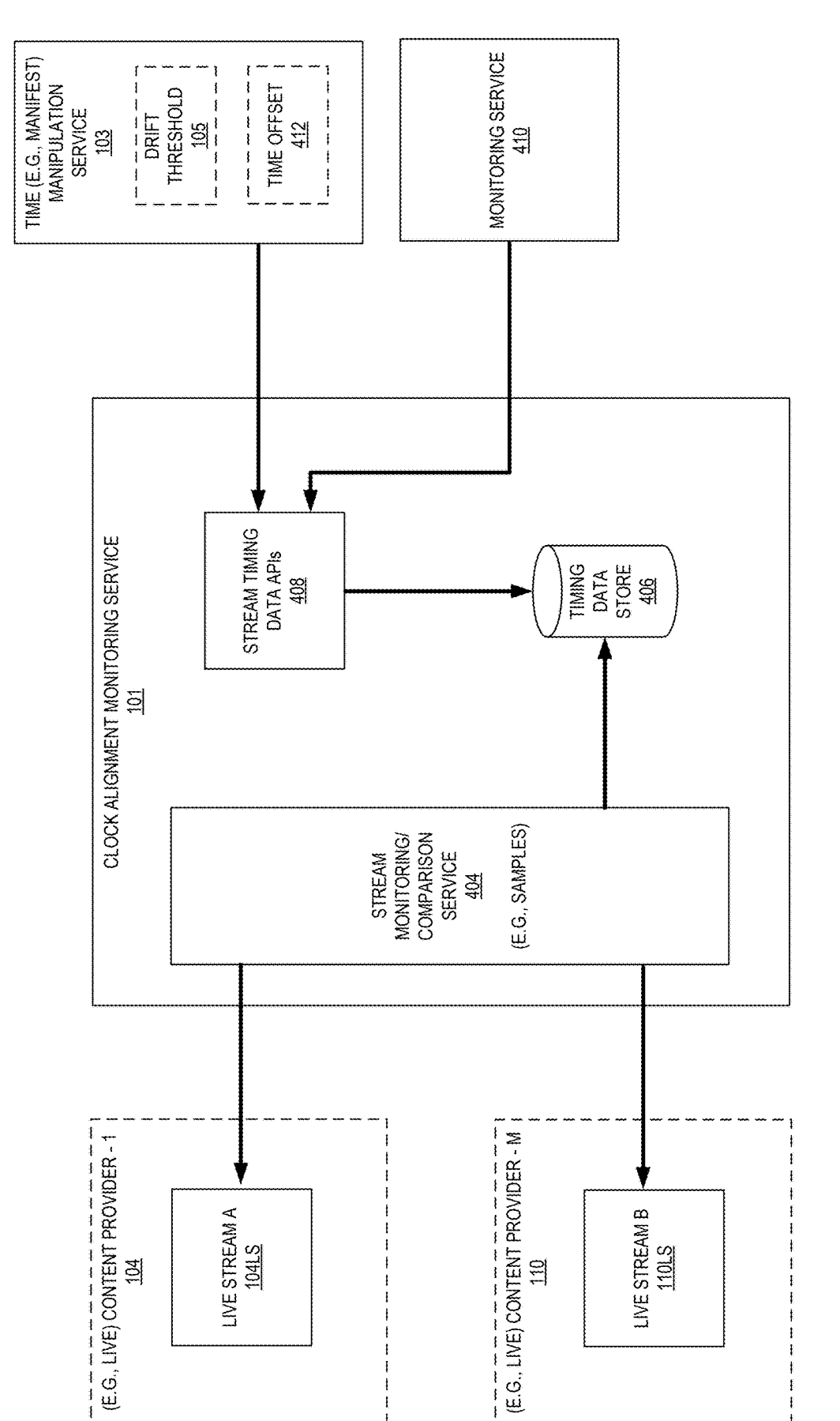
FIG. 4 is a diagram illustrating a clock alignment monitoring service including a stream monitoring/comparison service for a plurality of live streams according to some examples.

FIG. 4 is a diagram illustrating a clock alignment (e.g., stream timeline) monitoring service 101 including a stream monitoring/comparison service 404 for a plurality of live streams (104LS, 110LS) according to some examples. In certain examples, multiple live streams (e.g., from a same content provider) of a single event are utilized, for example, because there are (i) redundant live streams for a single event (e.g., in case of a failure of one or more of the live streams), (ii) different geographical regions (e.g., zones) (e.g., for video distribution), and/or (iii) different live streams of varying resolutions for the single event (e.g., to provide a corresponding resolution to a device capable of displaying that resolution).

In certain examples, the clock alignment monitoring service 101 determines (e.g., measures) the clock alignment for streams relative to a reference timeline, e.g., and persists the measured clock offset data (e.g., timing data) to timing data store 406, e.g., for that data to be vended to consumers that need the data (e.g., time (e.g., manifest) manipulation service 103 and/or monitoring service 410). In certain examples, monitoring service 410 allows access (e.g., viewing of) stream timing, etc. In certain examples, monitoring service 410 triggers an alarm or other action based on the time drift (e.g., in response to the time drift exceeding the drift threshold 105). In certain examples, the clock alignment monitoring service 101 data (e.g., from timing data store 406) allows an offset (e.g., later time) of a second stream from a first (e.g., reference) stream to be applied (e.g., by time (e.g., manifest) manipulation service 103) to the second stream's time data (e.g., timestamp and/or configurable delay) such that both streams have their content aligned to the reference timeline (e.g., within X number of milliseconds).

In certain examples, the stream monitoring/comparison service 404 is to sample each stream, e.g., with a sampling window (e.g., sampled at a sampling interval) (e.g., a 10 second sampling window), and then compare those samples to determine any time offset between those samples (e.g., and thus a time offset between those two streams).

Figure 5:
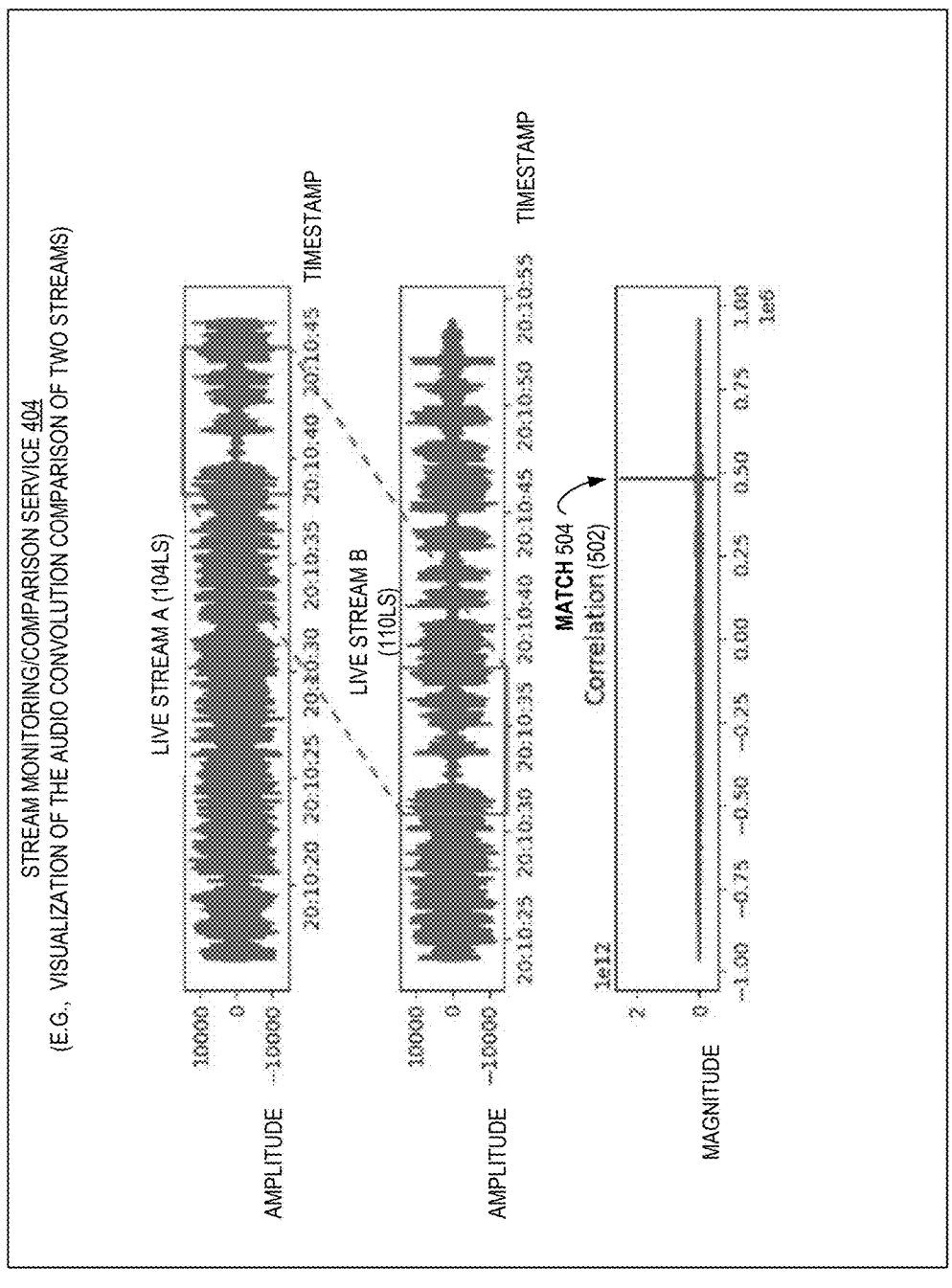
FIG. 5 is a diagram illustrating a stream monitoring/comparison service for a plurality of live streams utilizing audio convolution according to some examples.
Figure 6:
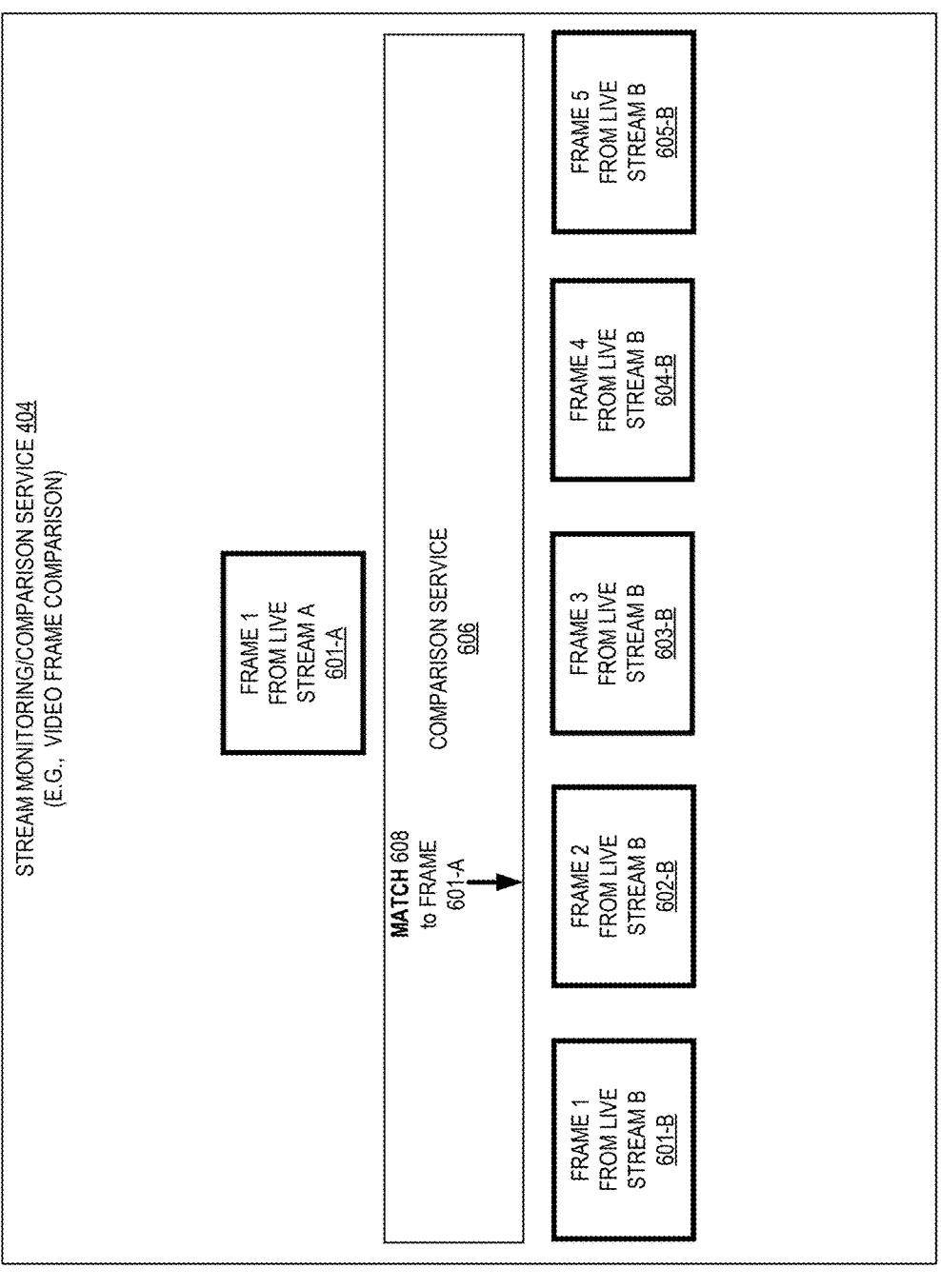
FIG. 6 is a diagram illustrating a stream monitoring/comparison service for a plurality of live streams utilizing video frames according to some examples.

In certain examples, the stream monitoring/comparison service 404 is a back-end monitoring component that implements comparison of streams, and then writes the resulting timing data to a durable storage layer (e.g., timing data store 406). In certain examples, a stream timing data (e.g., front-end) application programming interface (API) 408 reads the timing data from the storage layer (e.g., timing data store 406) when queried, e.g., by time (e.g., manifest) manipulation service 103 and/or monitoring service 410. In certain examples, this keeps the front-end clients decoupled from the back-end implementation, e.g., allowing for multiple options for implementing the stream comparison, and/or iteration of the back-end to improve accuracy and performance over time without disrupting the front-end application of the alignment data. FIGS. 5-6 illustrate example implementations for a comparison of streams. In certain examples, the time (e.g., manifest) manipulation service 103 performs an initial call into clock alignment monitoring service 101 (e.g., via API 408) to obtain the value of the time offset, and that value is stored as time offset 412 in time (e.g., manifest) manipulation service 103 (e.g., for use by time (e.g., manifest) manipulation service 103), for example, stored/used until a different time offset is obtained from clock alignment monitoring service 101, e.g., obtained in response to a change and/or check of the time offset in clock alignment monitoring service 101 (e.g., timing data store 406).

In certain examples, the clock alignment monitoring service 101 is to measure the time offset of a given stream to a reference stream's timeline. In certain examples, the choice of reference timeline should be flexible, but one approach is to pick one stream as the reference timeline for all streams of an event, e.g., all streams of a single content source identification (CSID) (e.g., where a CSID is assigned to each content provider or distribution source to uniquely identify the source). This means the Clock alignment monitoring service 101 offset for the reference stream would implicitly be zero (e.g., 0 ms), e.g., while another stream has a non-zero offset compared to the reference stream.

In certain examples, the clock alignment monitoring service 101 is designed such a way that the reference timeline is flexible, e.g., and the specific source of data for the reference timeline is abstracted from the individual stream measurements itself. In certain examples, this means that for the simple stream comparisons, the measurement operations are not tightly coupled to the knowledge that a particular stream is used as the reference timeline, e.g., such that maintaining that abstraction gives long-term flexibility to use other sources of reference timelines. For example, for some events, the clock alignment monitoring service 101 has access to out of band timing data that gives reference points in the stream for real world wall-clock times (e.g., such as a marker according to a standard, e.g., a Society of Cable and Telecommunications Engineers SCTE markers (e.g., SCTE-35)) or visual cues, to determine that other streams have a non-zero offset to the reference timeline. This could be particularly useful for events with multiple camera angles (e.g., such as racing), where multiple separate feeds (e.g., of different parts of a venue) are to be aligned to the same timeline even when the visual content cannot be directly compared.

FIG. 5 is a diagram illustrating a stream monitoring/comparison service 404 for a plurality of live streams utilizing audio convolution according to some examples. In certain examples, the corresponding audio for a sample from live stream 104LS is compared to the corresponding audio for a sample from live stream 110LS.

In certain examples, audio convolution compares the audio waveforms (shown as amplitude versus timestamp in FIG. 5) by treating each as a mathematical function and integrating the difference where they overlap. In certain examples, this allows a search for the presence of one audio signature inside of another, e.g., repeating the comparison of one waveform as a sliding window over the other. In certain examples, the result of the integral (e.g., correlation 502) where the two waveforms align with one another will be orders of magnitude higher than all of the rest and indicate a match 504. In certain examples, this peak in the results indicates exactly how far the sample was shifted to align properly (e.g., shown as 0.5 seconds time offset in FIG. 5). In certain examples, that time offset and the PDT timestamps in the manifest together allow for the measurement of the precise difference between PDT values relative to the content itself rather than the segment boundaries.

In certain examples, comparing the audio between two streams is the most efficient and most accurate option, e.g., where audio data requires less storage than videos or images, and audio sampling is done at a much higher rate than video sampling. In one case, a high-framerate video stream will be 60 frames per second, which gives 1 frame every 16.6 milliseconds. This means in this case, the time (e.g., manifest) manipulation service 103 can align the streams to within about 16 ms by comparing visuals alone. Certain audio is sampled at 44.1 khz, which is 44,100 samples per second. That is a little over 44 samples per millisecond, or 1 sample every 22 microseconds. Thus, the higher sampling rate for audio in this example provides more data to work with, and more confidence in the accuracy of the result.

FIG. 6 is a diagram illustrating a stream monitoring/comparison service 404 for a plurality of live streams utilizing video frames according to some examples. In certain examples, a frame 601-A (e.g., a first frame in video order) from a first video stream is compared to a plurality of frames (shown as frames 601-B, 602-B, 603-B, 604-B, and 605-B,) of a second video stream by comparison service 606, e.g., which indicates a matching (e.g., on a pixel by pixel basis) frame (with frame 601-A having a match 608 of frame 602-B). In certain examples, the comparison service 606 is to compare the timestamps for the matching frames from two streams, and determine the time offset from those timestamps.

In certain examples, comparison service 606 extracts frames from the video streams and performs (e.g., lightweight) image analysis to identify the frames that are most similar to one another as the point of overlap (e.g., match 608). In certain examples, this approach works because clock alignment monitoring service 101 is (e.g., only) interested in timing offsets, e.g., and does not need to perform any true video analysis.

In other examples (e.g., instead of audio convolution or a frame comparison), the (e.g., video quality assessment (VQA)) bitstreams (e.g., binary streams) themselves from each live stream are compared by stream monitoring/comparison service 404 to determine the time offset.

In further examples, a marker value (for example, a (e.g., not human perceptible) digital value, e.g., not a clapperboard or slate) is inserted into the livestreams (e.g., into the video and/or audio content) at a same time within the livestream, and those marker values are compared to determine any time offset therebetween.

Stream Timing Adjustment

In certain examples, the time (e.g., manifest) manipulation service 103 is to ensure that streams vended to clients are adjusted with clock alignment monitoring service 101 provided timing offsets at the origin, e.g., ensuring that all streams are aligned to the same reference timeline. In certain examples, the time (e.g., manifest) manipulation service 103 is one single system. In certain examples, the time (e.g., manifest) manipulation service 103 is not one single system, but rather a collection of components within services for various streaming technologies.

In certain examples, time (e.g., manifest) manipulation service 103 is to (i) adjust a stream timeline to align with the reference timeline, and (ii) ensure that any changes to a stream timeline due to clock drift are managed safely and conformant to streaming specifications.

In certain examples, e.g., for HTTP streams (e.g., DASH and HLS), the time (e.g., manifest) manipulation service 103 is to manipulate the timestamp(s) in a manifest file. In certain examples (e.g., as shown in FIG. 1), the time (e.g., manifest) manipulation service 103 is to detect (e.g., intercept) the manifest requests and perform a (e.g., JIT) replacement of timing data based on the time offset provided by the clock alignment monitoring service 101. In certain examples (e.g., in DASH), much of the timing data in the manifest is relative to the AvailabilityStartTime or SupplementalProperty, so the time (e.g., manifest) manipulation service 103 only needs to adjust the time in those specific places and everything else in the manifest will re-align.

FIG. 7 is a diagram illustrating a manifest 140B and a modified version 140B-M of that manifest from a time (e.g., manifest) manipulation service 103 according to some examples. In certain examples, the clock alignment monitoring service 101 indicates that stream B is two seconds slow relative to the reference timeline (e.g., stream A), and thus time (e.g., manifest) manipulation service 103 intercepts the request and alters the (e.g., all) absolute timestamps in the manifest to be two seconds later, e.g., shown in FIG. 7 as modifying the supplemental property 702 field (e.g., but not modifying the other field(s) of the manifest and/or not modifying the video/audio content for that manifest).

Certain examples herein align the clocks for the multiple streams associated with a single source (e.g., a single CSID). Certain examples herein support drift correction across multiple feeds and/or sources, e.g., when the same content is available on multiple CSIDs.

Certain examples herein align clocks of disparate streams based on the content alone, e.g., with no dependency on the surrounding configuration or environment. In certain examples, the "sameness" used for a comparison will change dynamically over time, e.g., it will not be static for the lifespan of the CSID.

Figure 8:
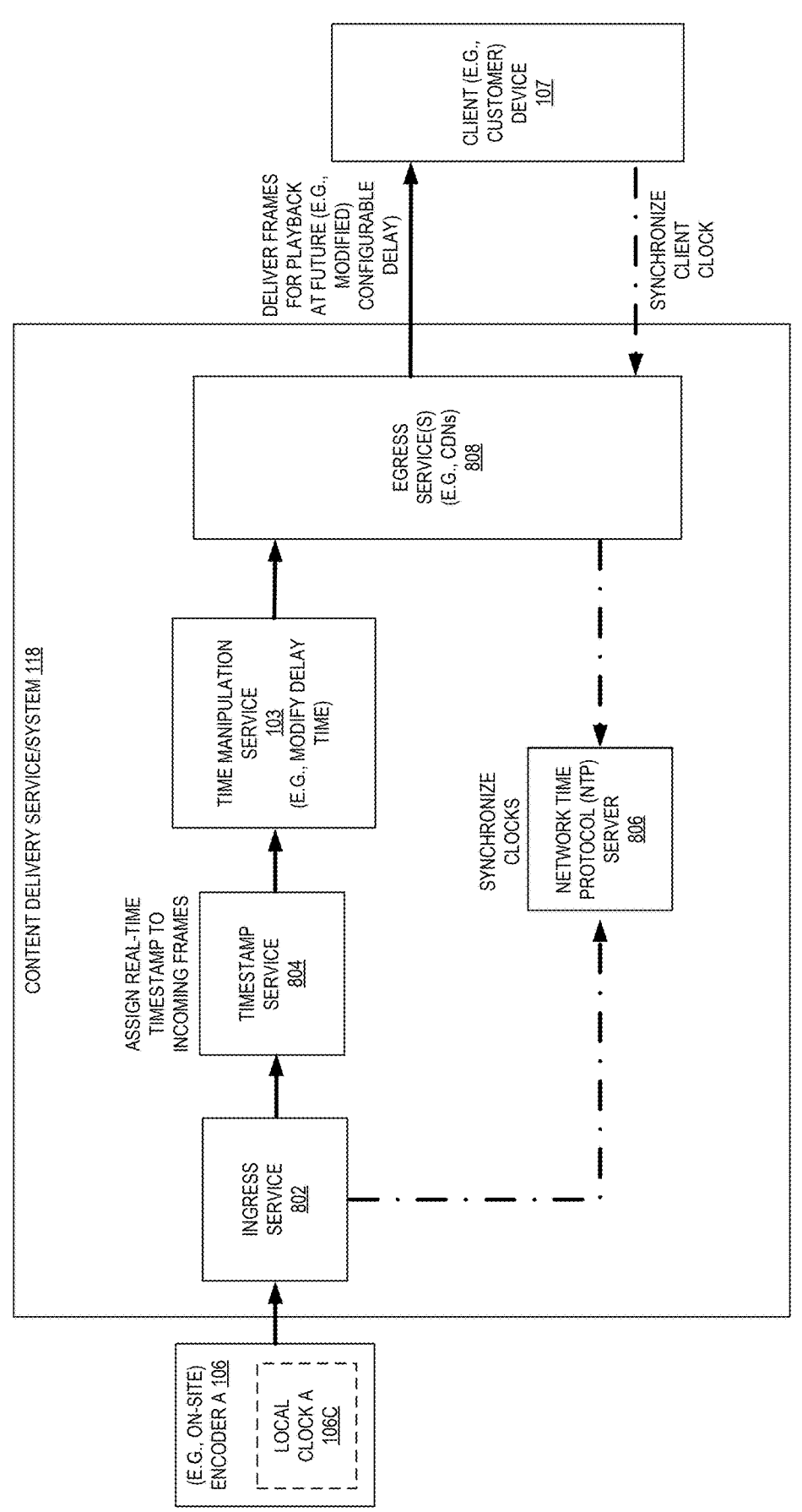
FIG. 8 is a diagram illustrating a time manipulation service for a synchronized clock streaming type of content delivery service/system according to some examples.

In certain examples, e.g., for a synchronized clock streaming service, such as, but not limited, to a Sye™ brand synchronized clock streaming service, the time (e.g., manifest) manipulation service 103 is to manipulate a configurable delay (e.g., as shown in FIG. 8).

FIG. 8 is a diagram illustrating a time manipulation service 103 for a synchronized clock streaming type (e.g., Sye™ brand synchronized clock streaming type) of content delivery service/system 118 according to some examples. In certain examples, a synchronized clock streaming type (e.g., Sye™ brand synchronized clock streaming type) of content delivery service/system 118 achieves synchronized playback at the live head by using network-time-protocol (NTP) synchronized clocks (e.g., based on a value sent by NTP server 806) between all servers (e.g., egress service(s) 808), and client device(s) 107 synchronize a software clock with the egress, e.g., ensuring all parts of the delivery are operating on the same timeline. In certain examples, content (e.g., from encoder 106, etc.) is assigned a timestamp (e.g., by timestamp service 804) at the ingress service 802 in real time, and passed through to clients 107 with instructions to play back at a specific time in the future based on a configurable delay. In certain examples, the configurable delay gives time for the content to be delivered to the devices and buffered to be ready for playback. This works because all of the clocks between the client and servers are synchronized, so the timestamp assigned at ingress can be reliably compared to the clock the client device 107 is using to decide when to display the content on the screen. However, it means that every ingress will have a slightly different timeline that is dependent on the specific time of ingestion. Certain examples herein do not modify the delivery clock synchronization. In certain examples, the timestamp service 804 and/or time manipulation service 103 are implemented within ingress service 802.

However, there are two issues that affect the time manipulation service 103. First, the NTP-synced clock is implicitly the same clock that is in the customer-facing client for interacting with the stream, e.g., all time shifting features scrub through the content based on client-provided timestamps, but those timestamps come from the reference timeline, not the NTP synchronized clocks. Second, the NTP-controlled timeline is independent of the upstream encoder 106, which means that in certain examples, any clock alignment monitoring service 101 offsets that are measured from the HTTP packager are not directly applicable.

To overcome these two issues, examples herein provide a separate content timeline parallel to the media stream, and have clients use that timeline (e.g., managed by time manipulation service 103) for customer-facing time shifting features. In certain examples, the clock-synced delivery is still used to enable low-latency synchronized playback at the live head, and the customer-facing clock alignment is provided at a layer above that.

FIG. 9 is a flow diagram illustrating operations of a method of a time synchronization of a second live stream to a first live stream according to some examples. Some or all of the operations 700 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some examples, one or more (or all) of the operations 900 are performed by clock alignment monitoring service 101 and time (e.g., manifest) manipulation service 103 of the content delivery system 118 (e.g., implemented in a provider network) of the other figures.

The operations 900 include, at block 902, receiving a first video of content and a first timestamp for the first video, and a second video of the content and a second timestamp for the second video. The operations 900 further include, at block 904, determining a time offset between the first video of the content and the second video of the content. The operations 900 further include, at block 906, sending the time offset to a client device or to a service to generate a modified second timestamp based at least in part on the time offset.

At least some examples of the disclosed technologies can be described in view of the following examples:

Example 1. A computer-implemented method comprising:
    receiving, at a content delivery service, a first live stream of an event and a first timestamp for the first live stream, and a second live stream of the event and a second timestamp for the second live stream;
    determining, by the content delivery service, a time offset between the first live stream of the event and the second live stream of the event;
    modifying, by the content delivery service, the second timestamp based at least in part on the time offset to generate a modified second timestamp for the second live stream to align the second live stream with the first live stream; and
    sending, by the content delivery service, the second live stream and the modified second timestamp to a client device or a storage.

Example 2. The computer-implemented method of example 1, wherein the second timestamp is in a manifest of the second live stream, and the modifying replaces the second timestamp in the manifest with the modified second timestamp.

Example 3. The computer-implemented method of example 1, wherein the determining comprises comparing first audio of the first live stream with second audio of the second live stream to generate the time offset.

Example 4. A computer-implemented method comprising:
    receiving a first video of content and a first timestamp for the first video, and a second video of the content and a second timestamp for the second video;
    determining a time offset between the first video of the content and the second video of the content; and
    sending the time offset to a client device or to a service to generate a modified second timestamp based at least in part on the time offset.

Example 5. The computer-implemented method of example 4, wherein the second timestamp is in a manifest of the second video, and the computer-implemented method further comprises replacing the second timestamp in the manifest with the modified second timestamp.

Example 6. The computer-implemented method of example 5, wherein the replacing comprises replacing a supplemental property field of the manifest.

Example 7. The computer-implemented method of example 5, wherein the replacing is in response to a request for the second video of the content from the client device, and the computer-implemented method further comprises sending the second video and the modified second timestamp to the client device.

Example 8. The computer-implemented method of example 4, wherein the determining comprises comparing first audio of the first video with second audio of the second video to generate the time offset.

Example 9. The computer-implemented method of example 8, wherein the first audio is a proper subset of audio of the first video, and the second audio is a proper subset of audio of the second video.

Example 10. The computer-implemented method of example 4, wherein the determining comprises:

performing a first convolution of first audio of the first video to generate first convolved audio, and a second convolution of second audio of the second video to generate second convolved audio; and comparing the first convolved audio and the second convolved audio to generate the time offset.

Example 11. The computer-implemented method of example 4, wherein the determining comprises comparing a first video frame of the first video with a plurality of video frames of the second video to generate the time offset.

Example 12. The computer-implemented method of example 4, wherein the sending is in response to the time offset exceeding a drift threshold.

Example 13. The computer-implemented method of example 4, wherein the sending the time offset is to a client device, and the client device generates the modified second timestamp based at least in part on the time offset.

Example 14. The computer-implemented method of example 4, wherein the sending the time offset is to a the service separate from the client device, and the service generates the modified second timestamp based at least in part on the time offset.

Example 15. The computer-implemented method of example 4, further comprising:

storing the time offset within the service; and modifying, by the service, a plurality of timestamps based at least in part on the stored time offset.

Example 16. A non-transitory computer-readable medium storing code that, when executed by a device, causes the device to perform a method comprising:

receiving a first video of content and a first timestamp for the first video, and a second video of the content and a second timestamp for the second video;

determining a time offset between the first video of the content and the second video of the content; and sending the time offset to a client device or to a service to generate a modified second timestamp based at least in part on the time offset.

Example 17. The non-transitory computer-readable medium of example 16, wherein the second timestamp is in a manifest of the second video, and the method further comprises replacing the second timestamp in the manifest with the modified second timestamp.

Example 18. The non-transitory computer-readable medium of example 17, wherein the replacing is in response to a request for the second video of the content from the client device, and the method further comprises sending the second video and the modified second timestamp to the client device.

Example 19. The non-transitory computer-readable medium of example 16, wherein the determining comprises comparing first audio of the first video with second audio of the second video to generate the time offset.

Example 20. The non-transitory computer-readable medium of example 16, wherein the determining comprises:

performing a first convolution of first audio of the first video to generate first convolved audio, and a second convolution of second audio of the second video to generate second convolved audio; and comparing the first convolved audio and the second convolved audio to generate the time offset.

Example 21. The non-transitory computer-readable medium of example 16, wherein the sending is in response to the time offset exceeding a drift threshold.

Exemplary environments, systems, etc. that the above may be used in are detailed below.

Figure 10:
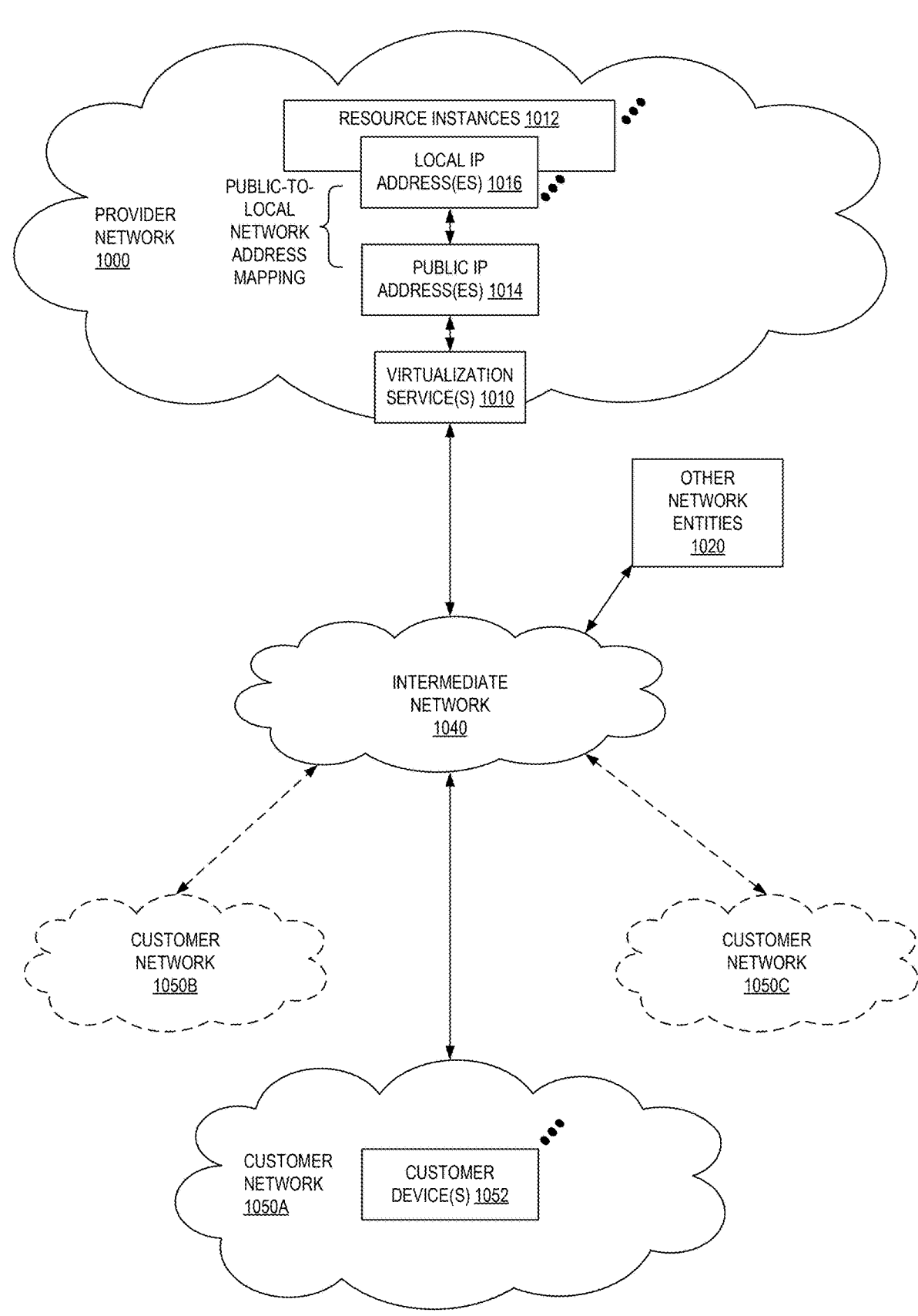
FIG. 10 illustrates an example provider network environment according to some examples.

FIG. 10 illustrates an example provider network (or "service provider system") environment according to some examples. A provider network 1000 may provide resource virtualization to customers via one or more virtualization services 1010 that allow customers to purchase, rent, or otherwise obtain instances 1012 of virtualized resources, including but not limited to computation and storage resources, implemented on devices within the provider network or networks in one or more data centers. Local Internet Protocol (IP) addresses 1016 may be associated with the resource instances 1012; the local IP addresses are the internal network addresses of the resource instances 1012 on the provider network 1000. In some examples, the provider network 1000 may also provide public IP addresses 1014 and/or public IP address ranges (e.g., Internet Protocol version 4 (IPv4) or Internet Protocol version 6 (IPv6) addresses) that customers may obtain from the provider 1000.

Conventionally, the provider network 1000, via the virtualization services 1010, may allow a customer of the service provider (e.g., a customer that operates one or more client networks 1050A-1050C including one or more customer device(s) 1052) to dynamically associate at least some public IP addresses 1014 assigned or allocated to the customer with particular resource instances 1012 assigned to the customer. The provider network 1000 may also allow the customer to remap a public IP address 1014, previously mapped to one virtualized computing resource instance 1012 allocated to the customer, to another virtualized computing resource instance 1012 that is also allocated to the customer. Using the virtualized computing resource instances 1012 and public IP addresses 1014 provided by the service provider, a customer of the service provider such as the operator of customer network(s) 1050A-1050C may, for example, implement customer-specific applications and present the customer's applications on an intermediate network 1040, such as the Internet. Other network entities 1020 on the intermediate network 1040 may then generate traffic to a destination public IP address 1014 published by the customer network(s) 1050A-1050C; the traffic is routed to the service provider data center, and at the data center is routed, via a network substrate, to the local IP address 1016 of the virtualized computing resource instance 1012 currently mapped to the destination public IP address 1014. Similarly, response traffic from the virtualized computing resource instance 1012 may be routed via the network substrate back onto the intermediate network 1040 to the source entity 1020.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some examples, the mapping of a standard IP address to a local IP address of a resource instance is the default launch configuration for all resource instance types.

At least some public IP addresses may be allocated to or obtained by customers of the provider network 1000; a customer may then assign their allocated public IP addresses to particular resource instances allocated to the customer. These public IP addresses may be referred to as customer public IP addresses, or simply customer IP addresses. Instead of being assigned by the provider network 1000 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 11:
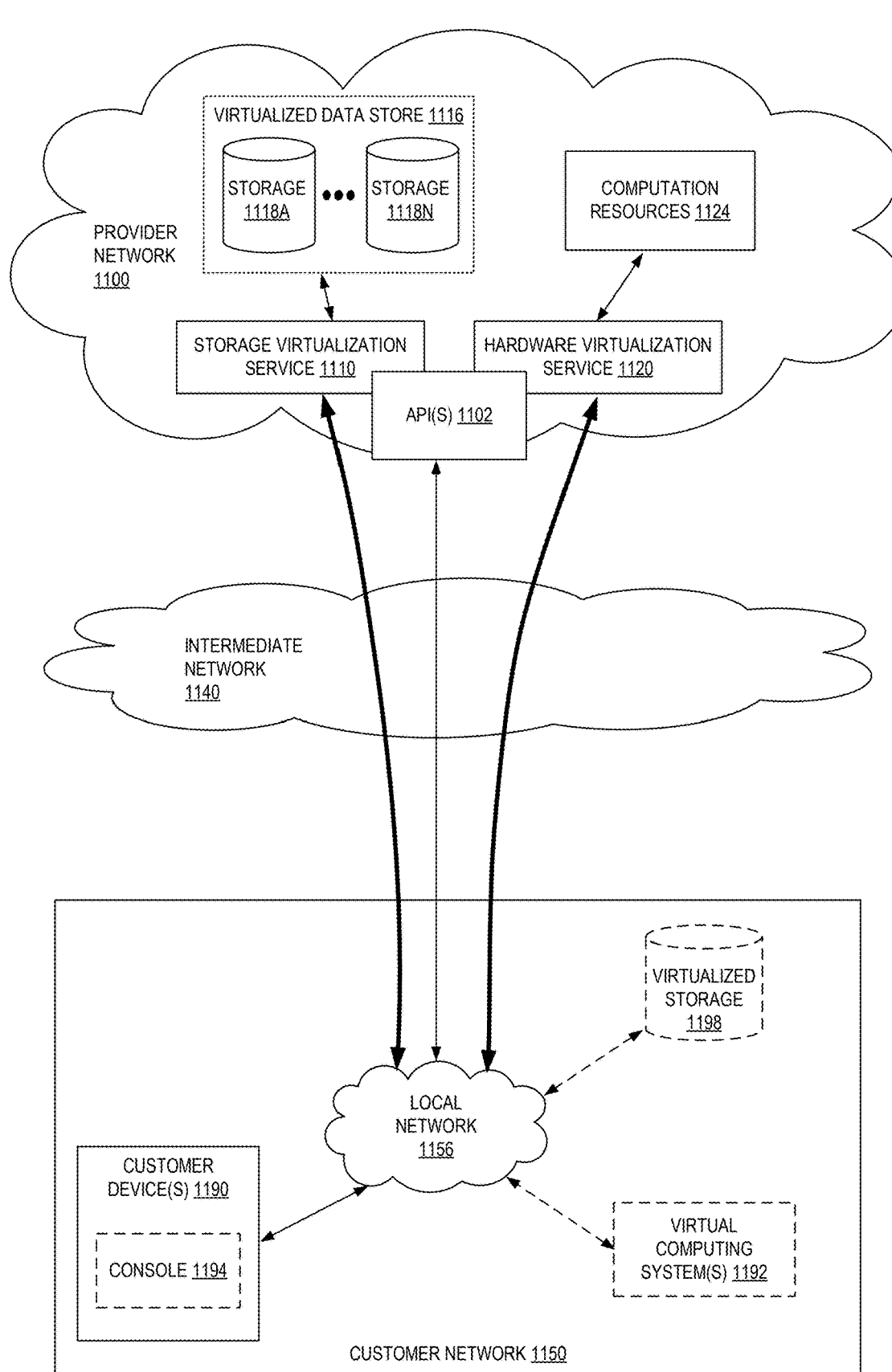
FIG. 11 is a block diagram of an example provider network that provides a storage service and a hardware virtualization service to customers according to some examples.

FIG. 11 is a block diagram of an example provider network that provides a storage service and a hardware virtualization service to customers, according to some examples. Hardware virtualization service 1120 provides multiple computation resources 1124 (e.g., VMs) to customers. The computation resources 1124 may, for example, be rented or leased to customers of the provider network 1100 (e.g., to a customer that implements customer network 1150). Each computation resource 1124 may be provided with one or more local IP addresses. Provider network 1100 may be configured to route packets from the local IP addresses of the computation resources 1124 to public Internet destinations, and from public Internet sources to the local IP addresses of computation resources 1124.

Provider network 1100 may provide a customer network 1150, for example coupled to intermediate network 1140 via local network 1156, the ability to implement virtual computing systems 1192 via hardware virtualization service 1120 coupled to intermediate network 1140 and to provider network 1100. In some examples, hardware virtualization service 1120 may provide one or more APIs 1102, for example a web services interface, via which a customer network 1150 may access functionality provided by the hardware virtualization service 1120, for example via a console 1194 (e.g., a web-based application, standalone application, mobile application, etc.). In some examples, at the provider network 1100, each virtual computing system 1192 at customer network 1150 may correspond to a computation resource 1124 that is leased, rented, or otherwise provided to customer network 1150.

From an instance of a virtual computing system 1192 and/or another customer device 1190 (e.g., via console 1194), the customer may access the functionality of storage service 1110, for example via one or more APIs 1102, to access data from and store data to storage resources 1118A-1118N of a virtual data store 1116 (e.g., a folder or "bucket", a virtualized volume, a database, etc.) provided by the provider network 1100. In some examples, a virtualized data store gateway (not shown) may be provided at the customer network 1150 that may locally cache at least some data, for example frequently-accessed or critical data, and that may communicate with storage service 1110 via one or more communications channels to upload new or modified data from a local cache so that the primary store of data (virtualized data store 1116) is maintained. In some examples, a user, via a virtual computing system 1192 and/or on another customer device 1190, may mount and access virtual data store 1116 volumes via storage service 1110 acting as a storage virtualization service, and these volumes may appear to the user as local (virtualized) storage 1198.

While not shown in FIG. 11, the virtualization service(s) may also be accessed from resource instances within the provider network 1100 via API(s) 1102. For example, a customer, appliance service provider, or other entity may access a virtualization service from within a respective virtual network on the provider network 1100 via an API 1102 to request allocation of one or more resource instances within the virtual network or within another virtual network.

Illustrative System

Figure 12:
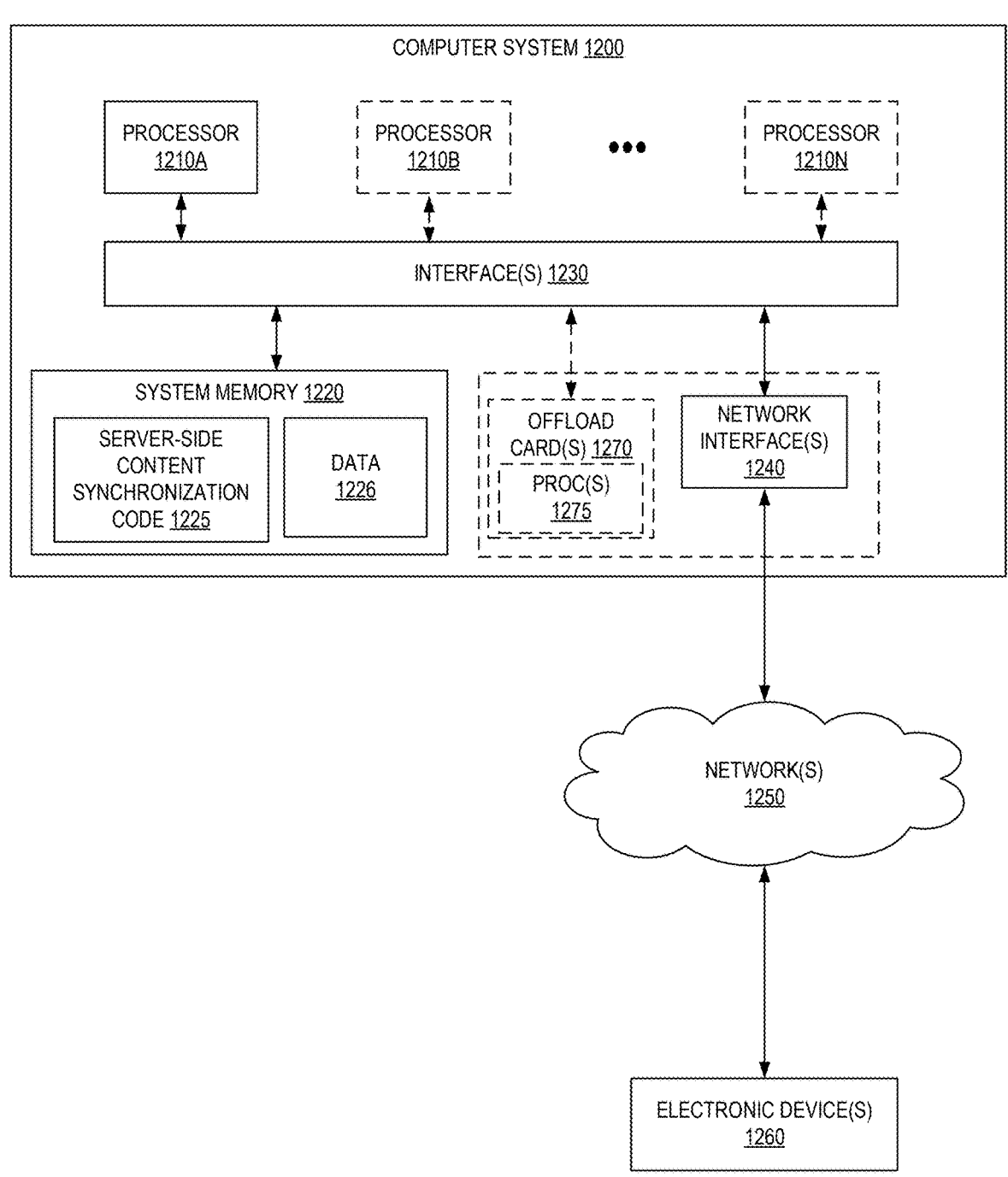
FIG. 12 is a block diagram illustrating an example computer system that may be used in some examples.

In some examples, a system that implements a portion or all of the techniques for content indexing as described herein may include a general-purpose computer system that includes or is configured to access one or more computer-accessible media, such as computer system 1200 illustrated in FIG. 12. In the illustrated example, computer system 1200 includes one or more processors 1210 coupled to a system memory 1220 via an input/output (I/O) interface 1230. Computer system 1200 further includes a network interface 1240 coupled to I/O interface 1230. While FIG. 12 shows computer system 1200 as a single computing device, in various examples a computer system 1200 may include one computing device or any number of computing devices configured to work together as a single computer system 1200.

In various examples, computer system 1200 may be a uniprocessor system including one processor 1210, or a multiprocessor system including several processors 1210 (e.g., two, four, eight, or another suitable number). Processors 1210 may be any suitable processors capable of executing instructions. For example, in various examples, processors 1210 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1210 may commonly, but not necessarily, implement the same ISA.

System memory 1220 may store instructions and data accessible by processor(s) 1210. In various examples, system memory 1220 may be implemented using any suitable memory technology, such as random-access memory (RAM), static RAM (SRAM), synchronous dynamic RAM (SDRAM), nonvolatile/Flash-type memory, or any other type of memory. In the illustrated example, program instructions and data implementing one or more desired functions, such as those methods, techniques, and data described above are shown stored within system memory 1220 as server-side content synchronization code 1225 (e.g., executable to implement, in whole or in part, the clock alignment monitoring service 101 and/or time (e.g., manifest) manipulation service 103) and data 1226.

In one example, I/O interface 1230 may be configured to coordinate I/O traffic between processor 1210, system memory 1220, and any peripheral devices in the device, including network interface 1240 or other peripheral interfaces. In some examples, I/O interface 1230 may perform any necessary protocol, timing, or other data transformations to convert data signals from one component (e.g., system memory 1220) into a format suitable for use by another component (e.g., processor 1210). In some examples, I/O interface 1230 may include support for devices attached through various types of peripheral buses, such as a variant of the Peripheral Component Interconnect (PCI) bus standard or the Universal Serial Bus (USB) standard, for example. In some examples, the function of I/O interface 1230 may be split into two or more separate components, such as a north bridge and a south bridge, for example. Also, in some examples some or all of the functionality of I/O interface 1230, such as an interface to system memory 1220, may be incorporated directly into processor 1210.

Network interface 1240 may be configured to allow data to be exchanged between computer system 1200 and other devices 1260 attached to a network or networks 1250, such as other computer systems or devices as illustrated in FIG. 1, for example. In various examples, network interface 1240 may support communication via any suitable wired or wireless general data networks, such as types of Ethernet network, for example. Additionally, network interface 1240 may support communication via telecommunications/telephony networks such as analog voice networks or digital fiber communications networks, via storage area networks (SANs) such as Fibre Channel SANs, or via I/O any other suitable type of network and/or protocol.

In some examples, a computer system 1200 includes one or more offload cards 1270 (including one or more processors 1275, and possibly including the one or more network interfaces 1240) that are connected using an I/O interface 1230 (e.g., a bus implementing a version of the Peripheral Component Interconnect-Express (PCI-E) standard, or another interconnect such as a QuickPath interconnect (QPI) or UltraPath interconnect (UPI)). For example, in some examples the computer system 1200 may act as a host electronic device (e.g., operating as part of a hardware virtualization service) that hosts compute instances, and the one or more offload cards 1270 execute a virtualization manager that can manage compute instances that execute on the host electronic device. As an example, in some examples the offload card(s) 1270 can perform compute instance management operations such as pausing and/or un-pausing compute instances, launching and/or terminating compute instances, performing memory transfer/copying operations, etc. These management operations may, in some examples, be performed by the offload card(s) 1270 in coordination with a hypervisor (e.g., upon a request from a hypervisor) that is executed by the other processors 1210A-1210N of the computer system 1200. However, in some examples the virtualization manager implemented by the offload card(s) 1270 can accommodate requests from other entities (e.g., from compute instances themselves), and may not coordinate with (or service) any separate hypervisor.

In some examples, system memory 1220 may be one example of a computer-accessible medium configured to store program instructions and data as described above. However, in other examples, program instructions and/or data may be received, sent, or stored upon different types of computer-accessible media. Generally speaking, a computer-accessible medium may include non-transitory storage media or memory media such as magnetic or optical media, e.g., disk or DVD/CD coupled to computer system 1200 via I/O interface 1230. A non-transitory computer-accessible storage medium may also include any volatile or nonvolatile media such as RAM (e.g., SDRAM, double data rate (DDR) SDRAM, SRAM, etc.), read only memory (ROM), etc., that may be included in some examples of computer system 1200 as system memory 1220 or another type of memory. Further, a computer-accessible medium may include transmission media or signals such as electrical, electromagnetic, or digital signals, conveyed via a communication medium such as a network and/or a wireless link, such as may be implemented via network interface 1240.

Figure 13:
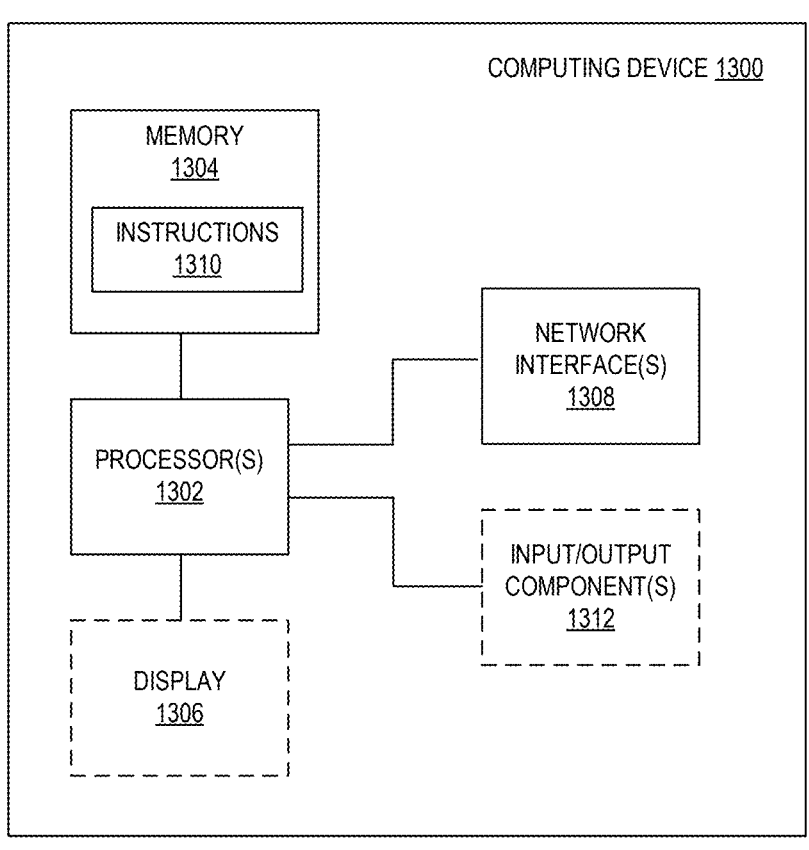
FIG. 13 illustrates a logical arrangement of a set of general components of an exemplary computing device that can be utilized in accordance with various examples.

FIG. 13 illustrates a logical arrangement of a set of general components of an example computing device 1300. Generally, a computing device 1300 can also be referred to as an electronic device. The techniques shown in the figures and described herein can be implemented using code and data stored and executed on one or more electronic devices (e.g., a client end station and/or server end station). Such electronic devices store and communicate (internally and/or with other electronic devices over a network) code and data using computer-readable media, such as non-transitory computer-readable storage media (e.g., magnetic disks, optical disks, Random Access Memory (RAM), Read Only Memory (ROM), flash memory devices, phase-change memory) and transitory computer-readable communication media (e.g., electrical, optical, acoustical or other form of propagated signals, such as carrier waves, infrared signals, digital signals). In addition, such electronic devices include hardware, such as a set of one or more processors 1302 (e.g., wherein a processor is a microprocessor, controller, microcontroller, central processing unit, digital signal processor, application specific integrated circuit, field programmable gate array, other electronic circuitry, a combination of one or more of the preceding) coupled to one or more other components, e.g., one or more non-transitory machine-readable storage media (e.g., memory 1304) to store code (for example, instructions 1310, e.g., which implement a content delivery service as disclosed herein), and a set of one or more wired or wireless network interfaces 1308 allowing the electronic device to transmit data to and receive data from other computing devices, typically across one or more networks (e.g., Local Area Networks (LANs), the Internet). The coupling of the set of processors and other components is typically through one or more interconnects within the electronic device, (e.g., busses and possibly bridges). Thus, the non-transitory machine-readable storage media (e.g., memory 1304) of a given electronic device typically stores code (e.g., instructions 1310) for execution on the set of one or more processors 1302 of that electronic device. One or more parts of various examples may be implemented using different combinations of software, firmware, and/or hardware.

A computing device 1300 can include some type of display element 1306, such as a touch screen or liquid crystal display (LCD), although many devices such as portable media players might convey information via other means, such as through audio speakers, and other types of devices such as server end stations may not have a display element 1306 at all. As discussed, some computing devices used in some examples include at least one input and/or output component(s) 1312 able to receive input from a user. This input component can include, for example, a push button, touch pad, touch screen, wheel, joystick, keyboard, mouse, keypad, or any other such device or element whereby a user is able to input a command to the device. In some examples, however, such a device might be controlled through a combination of visual and/or audio commands and utilize a microphone, camera, sensor, etc., such that a user can control the device without having to be in physical contact with the device.

Figure 14:
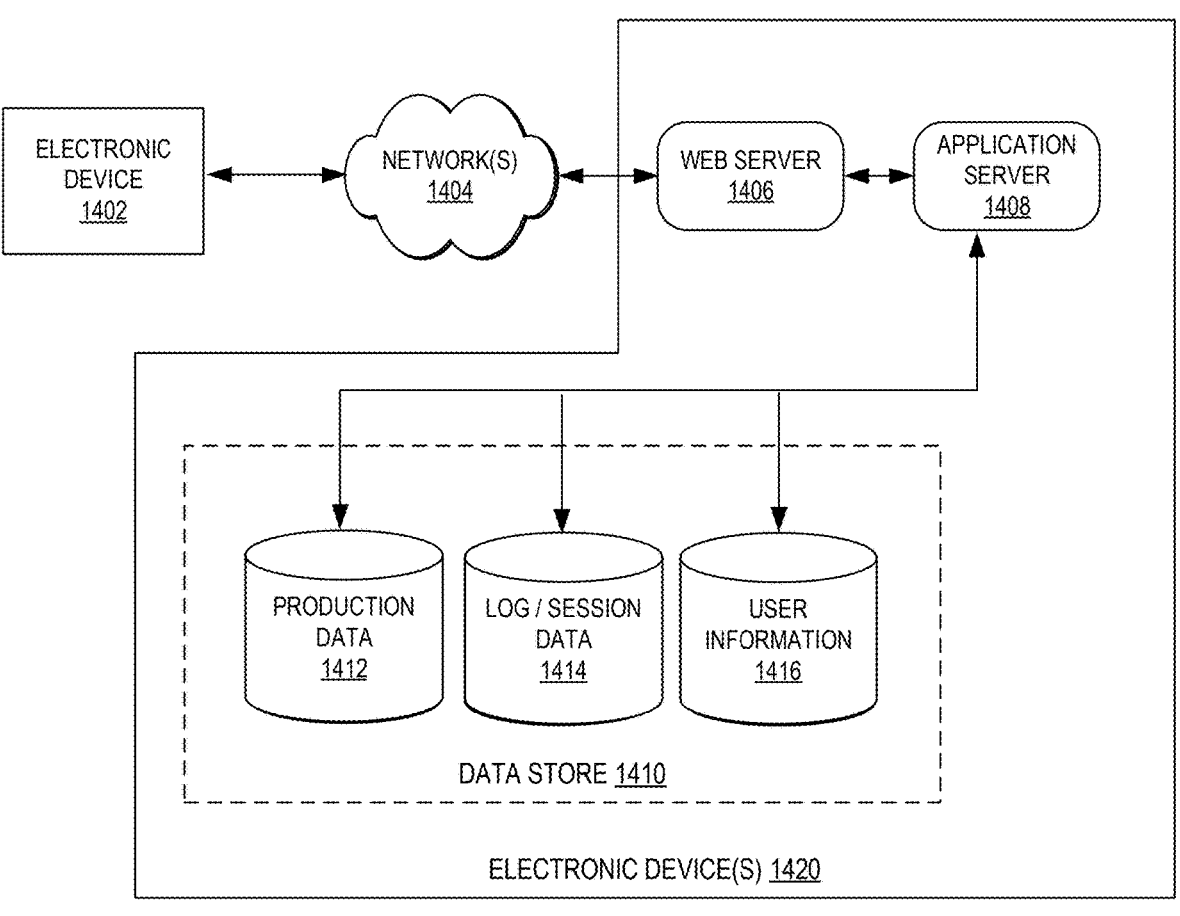
FIG. 14 illustrates an example of an environment for implementing aspects in accordance with various examples.

As discussed, different approaches can be implemented in various environments in accordance with the described examples. For example, FIG. 14 illustrates an example of an environment 1400 for implementing aspects in accordance with various examples. For example, in some examples messages are HyperText Transfer Protocol (HTTP) requests that are received by a web server (e.g., web server 1406), and the users, via electronic devices, may interact with the provider network via a web portal provided via the web server 1406 and application server 1408. As will be appreciated, although a web-based environment is used for purposes of explanation, different environments may be used, as appropriate, to implement various examples. The system includes an electronic client device 1402, which may also be referred to as a client device and can be any appropriate device operable to send and receive requests, messages, or information over an appropriate network 1404 and convey information back to a user of the device 1402. Examples of such client devices include personal computers (PCs), cell phones, handheld messaging devices, laptop computers, set-top boxes, personal data assistants, electronic book readers, wearable electronic devices (e.g., glasses, wristbands, monitors), and the like. The one or more networks 1404 can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network 1404 includes the Internet, as the environment includes a web server 1406 for receiving requests and serving content in response thereto, although for other networks an alternative device serving a similar purpose could be used, as would be apparent to one of ordinary skill in the art.

The illustrative environment includes at least one application server 1408 and a data store 1410. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices and data storage media, in any standard, distributed or clustered environment. The application server 1408 can include any appropriate hardware and software for integrating with the data store 1410 as needed to execute aspects of one or more applications for the client device 1402 and handling a majority of the data access and business logic for an application. The application server 1408 provides access control services in cooperation with the data store 1410 and is able to generate content such as text, graphics, audio, video, etc., to be transferred to the client device 1402, which may be served to the user by the web server in the form of HyperText Markup Language (HTML), Extensible Markup Language (XML), JavaScript Object Notation (JSON), or another appropriate unstructured or structured language in this example. The handling of all requests and responses, as well as the delivery of content between the client device 1402 and the application server 1408, can be handled by the web server 1406. It should be understood that the web server 1406 and application server 1408 are not required and are merely example components, as structured code discussed herein can be executed on any appropriate device or host machine as discussed elsewhere herein.

The data store 1410 can include several separate data tables, databases, or other data storage mechanisms and media for storing data relating to a particular aspect. For example, the data store illustrated includes mechanisms for storing production data 1412 and user information 1416, which can be used to serve content for the production side. The data store 1410 also is shown to include a mechanism for storing log or session data 1414. It should be understood that there can be many other aspects that may need to be stored in the data store, such as page image information and access rights information, which can be stored in any of the above listed mechanisms as appropriate or in additional mechanisms in the data store 1410. The data store 1410 is operable, through logic associated therewith, to receive instructions from the application server 1408 and obtain, update, or otherwise process data in response thereto. In one example, a user might submit a search request for a certain type of item. In this case, the data store 1410 might access the user information 1416 to verify the identity of the user and can access a production data 1412 to obtain information about items of that type. The information can then be returned to the user, such as in a listing of results on a web page that the user is able to view via a browser on the user device 1402. Information for a particular item of interest can be viewed in a dedicated page or window of the browser.

The web server 1406, application server 1408, and/or data store 1410 may be implemented by one or more electronic devices 1420, which can also be referred to as electronic server devices or server end stations, and may or may not be located in different geographic locations. Each of the one or more electronic devices 1420 may include an operating system that provides executable program instructions for the general administration and operation of that device and typically will include computer-readable medium storing instructions that, when executed by a processor of the device, allow the device to perform its intended functions. Suitable implementations for the operating system and general functionality of the devices are known or commercially available and are readily implemented by persons having ordinary skill in the art, particularly in light of the disclosure herein.

The environment in one example is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 14. Thus, the depiction of the environment 1400 in FIG. 14 should be taken as being illustrative in nature and not limiting to the scope of the disclosure.

Various examples discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and/or other devices capable of communicating via a network.

Most examples utilize at least one network that would be familiar to those skilled in the art for supporting communications using any of a variety of commercially-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In examples utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

The environment can include a variety of data stores and other memory and storage media as discussed above. These can reside in a variety of locations, such as on a storage medium local to (and/or resident in) one or more of the computers or remote from any or all of the computers across the network. In a particular set of examples, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, services, or other elements located within at least one working memory device, including an operating system and application programs, such as a client application or web browser. It should be appreciated that alternate examples may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program code, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various examples.

In the preceding description, various examples are described. For purposes of explanation, specific configurations and details are set forth in order to provide a thorough understanding of the examples. However, it will also be apparent to one skilled in the art that the examples may be practiced without the specific details. Furthermore, well-known features may be omitted or simplified in order not to obscure the example being described.

Bracketed text and blocks with dashed borders (e.g., large dashes, small dashes, dot-dash, and dots) are used herein to illustrate optional operations that add additional features to some examples. However, such notation should not be taken to mean that these are the only options or optional operations, and/or that blocks with solid borders are not optional in certain examples.

Reference numerals with suffix letters (e.g., 1118A-1118N) may be used to indicate that there can be one or multiple instances of the referenced entity in various examples, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various examples.

References to "one example," "an example," "a certain example," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

Moreover, in the various examples described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given example requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
receiving, at a content delivery service, a first live stream of an event and a first timestamp for the first live stream, and a second live stream of the event and a second timestamp for the second live stream;
determining, by the content delivery service, a time offset between the first live stream of the event and the second live stream of the event;
modifying, by the content delivery service, the second timestamp based at least in part on the time offset to generate a modified second timestamp for the second live stream to align the second live stream with the first live stream; and
sending, by the content delivery service, the second live stream and the modified second timestamp to a client device or a storage.

2. The computer-implemented method of claim 1, wherein the second timestamp is in a manifest of the second live stream, and the modifying replaces the second timestamp in the manifest with the modified second timestamp.

3. The computer-implemented method of claim 1, wherein the determining comprises comparing first audio of the first live stream with second audio of the second live stream to generate the time offset.

4. A computer-implemented method comprising:
receiving a first video of content and a first timestamp for the first video, and a second video of the content and a second timestamp for the second video;
determining a time offset between the first video of the content and the second video of the content; and
sending the time offset to a client device or to a service to generate a modified second timestamp based at least in part on the time offset.

5. The computer-implemented method of claim 4, wherein the second timestamp is in a manifest of the second video, and the computer-implemented method further comprises replacing the second timestamp in the manifest with the modified second timestamp.

6. The computer-implemented method of claim 5, wherein the replacing comprises replacing a supplemental property field of the manifest.

7. The computer-implemented method of claim 5, wherein the replacing is in response to a request for the second video of the content from the client device, and the computer-implemented method further comprises sending the second video and the modified second timestamp to the client device.

8. The computer-implemented method of claim 4, wherein the determining comprises comparing first audio of the first video with second audio of the second video to generate the time offset.

9. The computer-implemented method of claim 4, further comprising:
storing the time offset within the service; and
modifying, by the service, a plurality of timestamps based at least in part on the stored time offset.

10. The computer-implemented method of claim 4, wherein the determining comprises:
performing a first convolution of first audio of the first video to generate first convolved audio, and a second convolution of second audio of the second video to generate second convolved audio; and
comparing the first convolved audio and the second convolved audio to generate the time offset.

11. The computer-implemented method of claim 4, wherein the determining comprises comparing a first video frame of the first video with a plurality of video frames of the second video to generate the time offset.

12. The computer-implemented method of claim 4, wherein the sending is in response to the time offset exceeding a drift threshold.

13. The computer-implemented method of claim 4, wherein the sending the time offset is to a client device, and the client device generates the modified second timestamp based at least in part on the time offset.

14. The computer-implemented method of claim 4, wherein the sending the time offset is to the service that is separate from the client device, and the service generates the modified second timestamp based at least in part on the time offset.

15. A non-transitory computer-readable medium storing code that, when executed by a device, causes the device to perform a method comprising:
receiving a first video of content and a first timestamp for the first video, and a second video of the content and a second timestamp for the second video;
determining a time offset between the first video of the content and the second video of the content; and
sending the time offset to a client device or to a service to generate a modified second timestamp based at least in part on the time offset.

16. The non-transitory computer-readable medium of claim 15, wherein the second timestamp is in a manifest of the second video, and the method further comprises replacing the second timestamp in the manifest with the modified second timestamp.

17. The non-transitory computer-readable medium of claim 16, wherein the replacing is in response to a request for the second video of the content from the client device, and the method further comprises sending the second video and the modified second timestamp to the client device.

18. The non-transitory computer-readable medium of claim 15, wherein the determining comprises comparing first audio of the first video with second audio of the second video to generate the time offset.

19. The non-transitory computer-readable medium of claim 15, wherein the determining comprises:

performing a first convolution of first audio of the first video to generate first convolved audio, and a second convolution of second audio of the second video to generate second convolved audio; and comparing the first convolved audio and the second convolved audio to generate the time offset.

20. The non-transitory computer-readable medium of claim 15, wherein the sending is in response to the time offset exceeding a drift threshold.

\* \* \* \* \*